(12) United States Patent  (10) Patent No.: US 9,826,070 B2
Murashov et al.  (45) Date of Patent: Nov. 21, 2017

(54) COMMUNICATION APPARATUS

(71) Applicants: Anton Murashov, London (GB); Evgeny Vasin, London (GB); Nikolay Derbenev, London (GB)

(72) Inventors: Anton Murashov, London (GB); Evgeny Vasin, London (GB); Nikolay Derbenev, London (GB)

(73) Assignee: Q Telecom Ltd, London (GB)

( * ) Notice: Subject to any disclaimer, the term of this patent is extended or adjusted under 35 U.S.C. 154(b) by 0 days.

(21) Appl. No.: 14/766,940

(22) PCT Filed: Feb. 11, 2014

(86) PCT No.: PCT/GB2014/050397
§ 371 (c)(1),
(2) Date: Aug. 10, 2015

(87) PCT Pub. No.: WO2014/122487
PCT Pub. Date: Aug. 14, 2014

(65) Prior Publication Data
US 2015/0373167 A1    Dec. 24, 2015

(30) Foreign Application Priority Data
Feb. 11, 2013  (GB) .................................. 1302402.1

(51) Int. Cl.
*H04L 29/06*   (2006.01)
*H04L 29/08*   (2006.01)
(Continued)

(52) U.S. Cl.
CPC ............ *H04L 69/22* (2013.01); *H04L 5/0044* (2013.01); *H04L 45/74* (2013.01); *H04L 69/16* (2013.01);
(Continued)

(58) Field of Classification Search
CPC ....................................................... H04L 69/22
See application file for complete search history.

(56) References Cited

U.S. PATENT DOCUMENTS 5,774,877 A * 6/1998 Patterson, Jr. ......... G06Q 20/32
                                                       705/35
6,816,455 B2 * 11/2004 Goldberg ............ H04L 63/0254
                                                       370/230
(Continued)

FOREIGN PATENT DOCUMENTS

| JP | 2002-230458 A | 8/2002 |
| JP | 2012-533231 A | 12/2012 |
| WO | 2011006117 A2 | 1/2011 |

OTHER PUBLICATIONS

Japanese Office Actions for Japanese Application No. 2015-556573 dated Mar. 28, 2017, and an English translation thereof.

*Primary Examiner* — Andrew Lai
*Assistant Examiner* — Jamaal Henson
(74) *Attorney, Agent, or Firm* — Harness, Dickey & Pierce, P.L.C.

(57) ABSTRACT

The present invention relates to a network communication apparatus 150, which comprises: means for receiving data units, the data units comprising payload data; means for forwarding said data units on to a further network location; means for inspecting the payload data of a data unit; and means for modifying said data unit before the entire data unit has been forwarded on in dependence on the outcome of the data unit inspection thereby to alter the subsequent handling of that modified data unit once it has been forwarded on. The present invention also extends to a communication system and to a corresponding method of monitoring network communications.

27 Claims, 19 Drawing Sheets

(51) Int. Cl.
*H04L 5/00* (2006.01)
*H04L 12/741* (2013.01)

(52) U.S. Cl.
CPC .......... *H04L 69/321* (2013.01); *H04L 69/324* (2013.01)

(56) References Cited

U.S. PATENT DOCUMENTS

| | | | |
|---|---|---|---|
| 7,188,190 B1* | 3/2007 | Kojima | H04L 49/10 709/229 |
| 2002/0009079 A1* | 1/2002 | Jungck | H04L 29/12066 370/389 |
| 2002/0107796 A1 | 8/2002 | Nakai | |
| 2002/0112085 A1* | 8/2002 | Berg | H04L 29/06 709/250 |
| 2003/0037154 A1* | 2/2003 | Poggio | H04L 47/62 709/230 |
| 2004/0017488 A1* | 1/2004 | Watanabe | G06K 15/186 348/229.1 |
| 2005/0105556 A1* | 5/2005 | Joung | H04L 69/22 370/469 |
| 2006/0106708 A1* | 5/2006 | Abushaban | G06Q 40/04 705/37 |
| 2007/0156919 A1* | 7/2007 | Potti | G06F 8/67 709/238 |
| 2009/0323703 A1* | 12/2009 | Bragagnini | H04L 29/12009 370/401 |
| 2013/0088997 A1* | 4/2013 | Briscoe | H04L 47/10 370/252 |

* cited by examiner

COMMUNICATION APPARATUS

The present invention relates to a network communication apparatus. This invention also relates a method of monitoring network communications and to a communication system.

High performance computing systems often demand low latency processing and networking, particularly in the fields of signal and telecommunication intelligence, cyber security, data mining, financial modelling and trading, medical imaging and research, scientific modelling and seismic analysis. In automated securities trading, where trade orders occur many multiple times per second, reducing the reaction time to act on financial data is important for high frequency traders; the time taken to receive, process and act is crucial in exploiting market inefficiencies through an information advantage.

In securities trading, financial data from an exchange is accessed by a broker via a network. The financial data is further distributed to clients of the broker, thereby creating a network such that a client is able to access information from the exchange and issue trade orders.

A trivial limiting-factor for signal latency is governed by the light path—a factor which governs the time taken for data to cover a distance between a host and client. Traditionally, brokers seek to minimise their latency as part of a competitive service to clients. Naturally, a broker will minimise their distance from the exchange servers and thus the distance data must travel. Invariably, other aspects of the network offer a far greater threat to latency. These are also sought to be reduced; often at great expense. Processing of trade orders, beyond re-routing to the exchange, from clients also takes the form of broker-side risk management and regulation.

Direct Market Access (DMA) for clients allows low latency throughput of information via minimal broker-side processing. Nonetheless, essential risk management monitoring operations must be observed by the broker, necessitating some degree of trade order processing. This particular form of processing typically takes the form of filtering client orders which are non-compliant with the broker's limits or other restrictions; this processing induces latency. The limitation of the functionality of the state of the art extends beyond the financial sphere.

It is an aim of the present invention to at least alleviate some of the aforementioned problems.

According to one aspect of the invention, there is provided a network communication apparatus, which comprises means for receiving data units (such as a receiver, input port or network interface module), the data units comprising control information and payload data; means for forwarding said data units (such as a transmitter, output port or a first module) on to a further network location in dependence on said control information; means for inspecting the payload data (such as a processor or flagging module); and means for modifying all or part of said data unit (such as an out control module) before said data unit has been forwarded on or while said data is being forwarded or outputted in dependence on the outcome of the payload data inspection thereby to alter the subsequent handling of that modified data unit once it has been forwarded on.

According to another aspect of the invention, there is provided a network communication apparatus, which comprises: means for receiving data units (such as a receiver, input port or network interface module), the data units comprising payload data; means for forwarding said data units (such as a transmitter, output port or a first module) on to a further network location; means for inspecting the payload data (such as a processor or flagging module) of a data unit; and means for modifying said data unit (such as an out control module) before the entire data unit has been forwarded on in dependence on the outcome of the data unit inspection thereby to alter the subsequent handling of that modified data unit once it has been forwarded on.

Preferably, the data units further comprise control information and the modification means is adapted to modify the control information.

Preferably, the control information includes at least one or more of the following: source and/or destination address information; sequencing information; and error detection information.

Preferably, the modification means is adapted to corrupt and/or overwrite at least part of the control information so that the data unit is subsequently dropped.

Preferably, the control information includes header and/or trailer information, preferably including one or more of the following network protocol information: TCP; UDP; IP; MAC; and error detection information.

Preferably, the modification means is adapted to modify a trailing portion of the data unit before the entire trailing portion has been forwarded on, and preferably after the remainder of the data unit has already been forwarded on. Preferably, the trailing portion includes control information.

Preferably, the modification means is adapted to overwrite at least a portion of a trailing checksum or cyclic redundancy check (CRC), and preferably wherein the modification means is adapted to corrupt the control information in the trailing portion of the data unit.

Preferably, the modification means is adapted to modify the data unit as the data unit is being forwarded on. Preferably, the modification means is adapted to corrupt and/or modify the payload data.

Preferably, the apparatus further comprises means for storing data units for subsequent onward transmission.

Preferably, the storage means is adapted to buffer a data unit that was modified as it was being forwarded on, the data unit having been modified so as to ensure that it would not arrive at its intended recipient and/or be dropped by its intended recipient.

Preferably, the modification means is adapted to modify the payload data of said buffered data unit prior to its subsequent onward transmission so as to prevent a request for the retransmission of the modified data unit.

Preferably, the modification means is adapted to modify the payload data of the buffered data unit, preferably at the level of the application layer, so that the intended recipient is able to process said subsequently transmitted data unit.

Preferably, the apparatus comprises means for delaying the forwarding on of the data unit so as to synchronise an output of the inspection means with the forwarding on of the final trailing portion of the data unit thereby to ensure that it is possible to modify the trailing portion of the data unit in dependence upon the outcome of the inspection means before the data unit has been entirely forwarded on.

Preferably, the modification means is adapted to modify the data unit as soon as an output from the inspection means is available.

Preferably, the apparatus further comprises means for determining whether a data unit has been received out of sequence, and wherein the forwarding means is adapted to forward the data units on in the correct sequence.

Preferably, the apparatus further comprises means for buffering data units received out of sequence for subsequent in sequence inspection by the inspecting means.

Preferably, the receiving means is adapted to detect the reception of a missing data unit and wherein the buffer is adapted to release the out of sequence data unit for inspection in response thereto.

Preferably, the apparatus further comprises means for storing payload data for subsequent retrieval and onward transmission.

Preferably, the inspecting means is adapted to inspect the payload data and/or the control information while the data unit is being forwarded on.

Preferably, the means for inspecting the payload data of the data unit is adapted to perform a deep-packet inspection of the data unit, preferably to the level of the application layer of the data unit.

Preferably, the data unit is passed both to the forwarding means and to the inspecting means.

Preferably, the data unit is continuously being forwarded on while the inspecting means is carrying out an inspection of the data unit. Preferably, the data unit is being stepped through the apparatus, preferably byte-wise, while the inspecting means is carrying out an inspection of the data unit.

Preferably, the inspecting means is adapted to parse the data unit to extract the payload data and/or control information for inspection while the data unit is being forwarded on.

Preferably, the inspecting means is adapted to determine at least one or more of the following based on an inspection of the control information: session information, sequencing information, receiving party identify, transmitting party identity, status information; and port information.

Preferably, the modification means is adapted to modify the data unit in dependence upon said control information.

Preferably, the payload data is in the form of an instruction or request, and the inspecting means is adapted to determine the validity and/or acceptability of said instruction or request.

Preferably, the instruction or request is a financial trading instruction.

Preferably, the modification means is adapted to modify the data unit in the event of an invalid or unacceptable instruction or request in the payload data.

Preferably, the data unit is a protocol data unit, including at least one of the following: a datagram; a segment; a packet; and a frame.

Preferably, the apparatus is in the form of a programmable logic device, preferably in the form of a Field Programmable Gate Array (FPGA) or an Application-Specific Integrated Circuit (ASIC).

Preferably, the functionality of the apparatus is implemented in hardware.

Preferably, the apparatus further comprises a TCP offloading engine.

Preferably, the apparatus further comprises: means for identifying a session associated with a data unit; and wherein the inspecting means is adapted to compare said data unit with parameter information relating to that session thereby to determine the validity and/or acceptability of the data unit.

According to another aspect of the invention, there is a network communication apparatus, which comprises means for receiving data units (such as a receiver, input port or network interface module); the data units comprising control information and payload data; means for forwarding said data units (such as a transmitter, output port or a first module) on to a further network location in dependence on said control information; means for inspecting the data unit (such as a processor or flagging module); and means for modifying said data unit (such as an out control module) before the entire data unit has been forwarded on in dependence on the outcome of the data unit inspection thereby to alter the subsequent handling of that modified data unit once it has been forwarded on.

According to a further aspect of the invention, there is provided a network communication apparatus, which comprises: means for receiving data units (such as a receiver, input port or network interface module), the data units comprising control information and payload data; means for forwarding said data units (such as a transmitter, output port or a first module) on to a further network location; means for identifying a session associated with a data unit; and means for inspecting said data unit (such as a processor or flagging module) to compare said data unit with parameter information relating to that session thereby to determine the validity and/or acceptability of the data unit.

Preferably, the session is a network session.

Preferably, the identifying means is adapted to identify the session based on the data unit control information, and preferably based on control information stored in a header of the data unit. Preferably, the session is a communication session between at least a pair of network entities, and wherein the data unit is intercepted by the communication apparatus.

Preferably, the apparatus further comprises a socket engine for identifying the session.

Preferably, the parameter information includes first information relating to a particular communication session between said network entities, and second information relating to all communications between said network entities.

Preferably, the second information relates to a financial trading parameter, such as a position, volume or limit.

Preferably, the parameter information is updated following each communication interaction between the network entities.

Preferably, the parameter information is updated in dependence of the payload data of each data unit communicated between the network entities.

Preferably, the parameter information is a cumulative record of the data units that have been forwarded on from the apparatus, preferably without modification.

Preferably, the inspecting means is adapted to compare the parameter information with the control information and/or the payload data, preferably as soon as the control information and/or payload data has been parsed.

Preferably, the parameter information is stored on the apparatus, preferably in the form of at least one hash table.

Preferably, the apparatus further comprises means for importing new information for association with a new network session in the event that there is no existing network session associated with a received data unit.

Preferably, the apparatus further comprises means for modifying said data unit before the entire data unit has been forwarded on in dependence on the outcome of the data unit inspection thereby to alter the subsequent handling of that modified data unit once it has been forwarded on.

According to a further aspect of the invention, there is a network communication apparatus, which comprises means for receiving data units (such as a receiver, input port or network interface module), the data units comprising control information and payload data; means for forwarding said (such as a transmitter, output port or a first module) data units on to a further network location in dependence on said control information; means for inspecting the data unit (such as a processor or flagging module); means for identifying a network session associated with a data unit (such as a processor or hash table); and means for comparing said data unit with status information (such as a processor or hash table) relating to that session thereby to determine the validity and/or acceptability of the data unit.

According to another aspect of the invention, there is provided a communication system comprising: a first network entity, preferably in the form of a server; a second network entity, preferably in the form of a client, connectable to the first network entity via a communications network; and an intermediate network entity which comprises a communications apparatus (as herein described) for intercepting communications between said first and second network entities.

Preferably, the first and second network entities communicate with one another via a communications protocol (optionally TCP/IP) thereby to communicate said data units between one another.

Preferably, the first network entity is a high frequency trading system, the second network entity is an exchange, and the intermediate network entity is a broker for monitoring trading activity between the trading system and the exchange.

According to an additional aspect of the invention, there is provided a method of monitoring network communication, which comprises receiving data units, the data units comprising control information and payload data; forwarding said data units on to a further network location in dependence on said control information; inspecting the data unit; and modifying said data unit before the entire data unit has been forwarded on in dependence on the outcome of the data unit inspection thereby to alter the subsequent handling of that modified data unit once it has been forwarded on.

According to a further aspect of the invention, there is provided a method of monitoring network communications, which comprises: receiving data units, the data units comprising payload data; forwarding said data units on to a further network location; inspecting the payload data of the data unit; and modifying said data unit before the entire data unit has been forwarded on in dependence on the outcome of the data unit inspection thereby to alter the subsequent handling of that modified data unit once it has been forwarded on.

Preferably, the method further comprises identifying a network session associated with the data unit; and comparing said data unit with parameter information relating to that session thereby to determine the validity and/or acceptability of the data unit.

Preferably the method of monitoring network communication is applied to a method of trading financial assets.

According to a further aspect of the invention, there is provided a network communication apparatus as herein described adapted to form part of a financial trading system.

In certain examples, the invention provides a communications apparatus that is adapted to intercept data communications between network entities (for example between a client and a server or host), analyse these communications and then either cause these communications to be subsequently dropped by the network, or allow them to continue on to their final destination. The apparatus does so by a process of "cut-through" filtering and inspection, in which a received data unit (data packet or frame) is passed through directly to the output for forwarding on while at the same time that data unit or frame is parsed and unpacked for inspection. The deep-packet inspection process involves identifying the particular communication session between the network entities based on the header information (via a hash table), and then using this information (which contains status and other information relating to the validity of the data unit) to assess the payload data within the data unit to determine whether or not that data unit is valid or authorised; that is, the payload data is inspected up to the "application layer" level. If the data unit is indeed valid or authorised the data unit or frame leaves the apparatus via the output unchanged, if instead the data unit or frame is not valid, then the final trailing checksum or CRC of the data unit or frame is corrupted or overwritten just prior to the trailing portion of the frame or data unit leaving the apparatus. The frame or data unit is then subsequently dropped by the network (or application layer logic for data unit destination or origin) due to the corrupt checksum or CRC. This apparatus thus keeps the filtering latency to a bare minimum, as inspection occurs while the data unit is actually being forwarded on, and the time it takes to cycle the unit through the apparatus as it is being forwarded on is synchronised with the time taken to parse and unpack the data unit and inspect it to determine whether or not it is in fact valid. A corrupted data unit is, from the perspective of TCP/IP, in effect treated as having been lost en route by a receiving entity (a host or server)—retransmission of the data unit will therefore occur according to the TCP/IP protocol specification and the retransmitted data unit will in turn also be corrupted and dropped (because it contains the same risk-violating payload that resulted in its corruption in the first place). Accordingly, if the packet violates the risk checks and the data unit is corrupted, the data unit is in parallel also buffered into memory. The buffered data unit is then modified in such a way as to contain valid TCP/IP elements, but a different (to that which the sender intended to send) payload data at the application layer level. This modification of payload is performed to make sure that the recipient will reject the data unit in the normal course of operation and then duly notify the sender with an error message (at the "application layer" level).

Further features of the invention are characterised by the dependent claims.

The invention extends to any novel aspects or features described and/or illustrated herein. The invention extends to methods and/or apparatus substantially as herein described and/or as illustrated with reference to the accompanying drawings.

The invention also provides a computer program and a computer program product for carrying out any of the methods described herein and/or for embodying any of the apparatus features described herein, and a computer readable medium having stored thereon a program for carrying out any of the methods described herein and/or for embodying any of the apparatus features described herein.

The invention also provides a signal embodying a computer program for carrying out any of the methods described herein and/or for embodying any of the apparatus features described herein, a method of transmitting such a signal, and a computer product having an operating system which supports a computer program for carrying out any of the methods described herein and/or for embodying any of the apparatus features described herein.

Any apparatus feature as described herein may also be provided as a method feature, and vice versa. As used herein, means plus function features may be expressed alternatively in terms of their corresponding structure, such as a suitably programmed processor and associated memory.

Any feature in one aspect of the invention may be applied to other aspects of the invention, in any appropriate combination. In particular, method aspects may be applied to apparatus aspects, and vice versa. Furthermore, any, some and/or all features in one aspect can be applied to any, some and/or all features in any other aspect, in any appropriate combination.

It should also be appreciated that particular combinations of the various features described and defined in any aspects of the invention can be implemented and/or supplied and/or used independently.

In this specification the word 'or' can be interpreted in the exclusive or inclusive sense unless stated otherwise.

Furthermore, features implemented in hardware may generally be implemented in software, and vice versa. Any reference to software and hardware features herein should be construed accordingly.

The invention extends to a network communication apparatus, a communication system and a method of monitoring network communication as described herein and/or substantially as illustrated with reference to the accompanying drawings.

The present invention is now described, purely by way of example, with reference to the accompanying diagrammatic drawings, in which:—

Figure 11A:
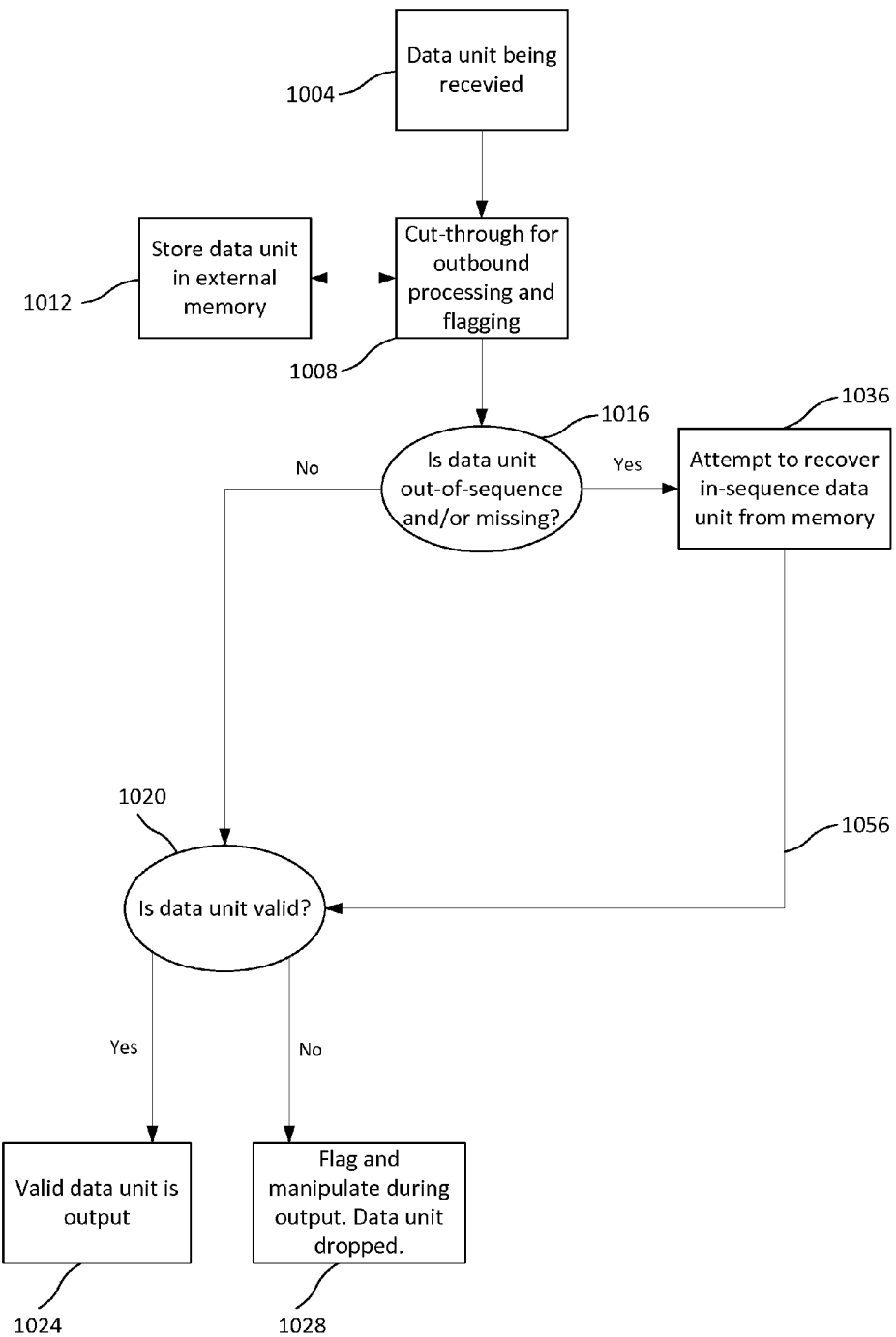
Figure 11B:
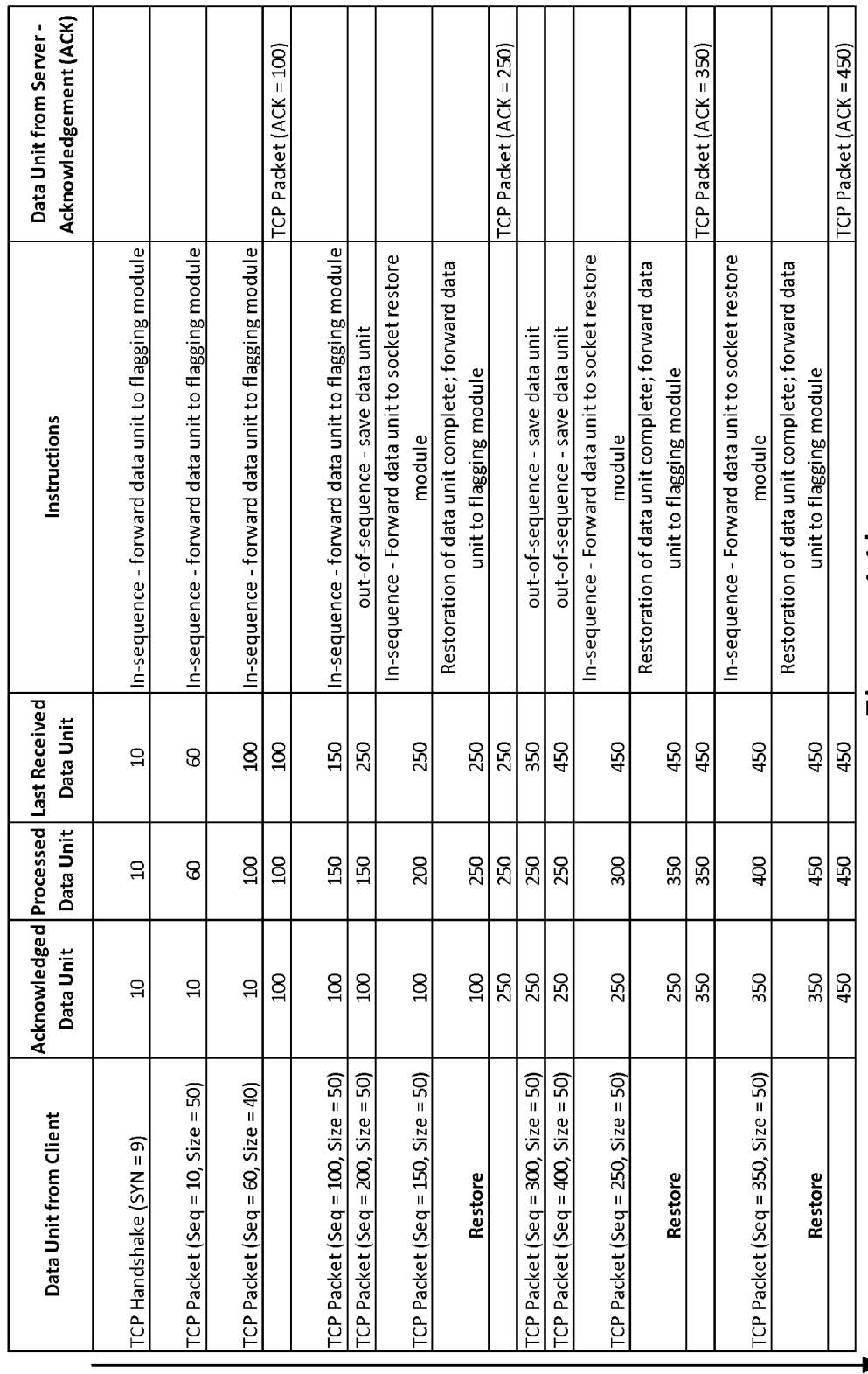
Figure 12:
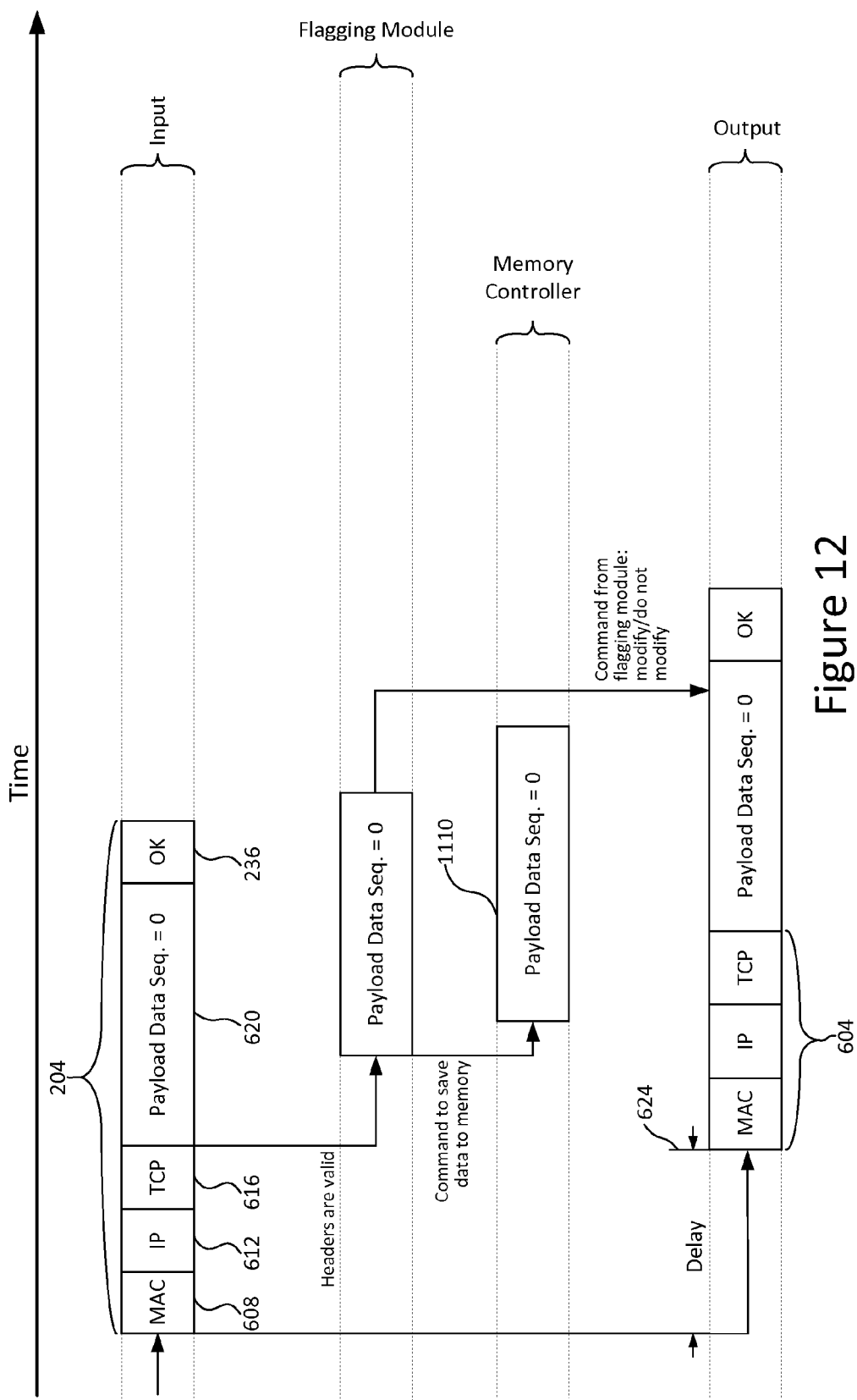
Figure 13:
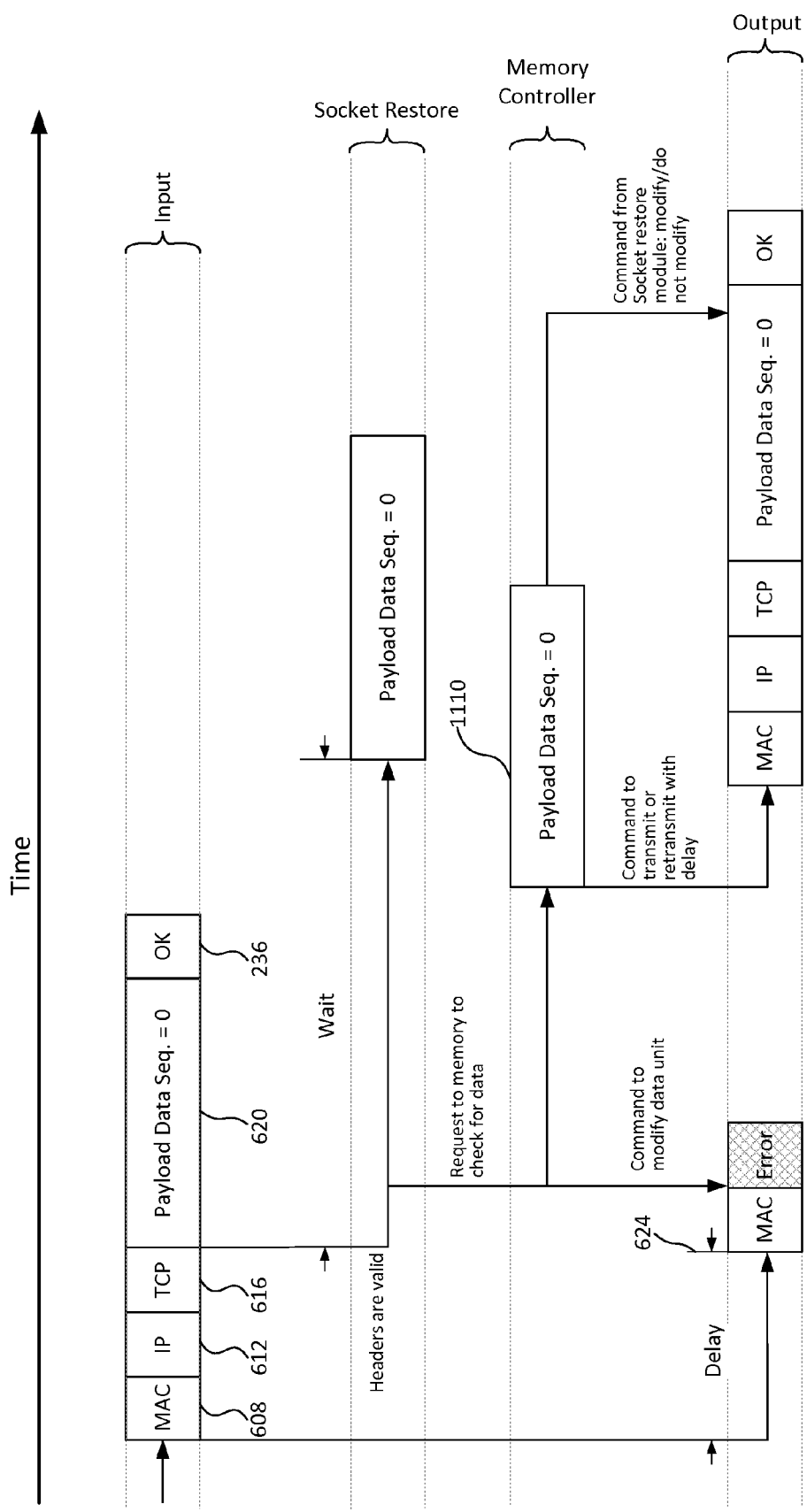
Figure 14:
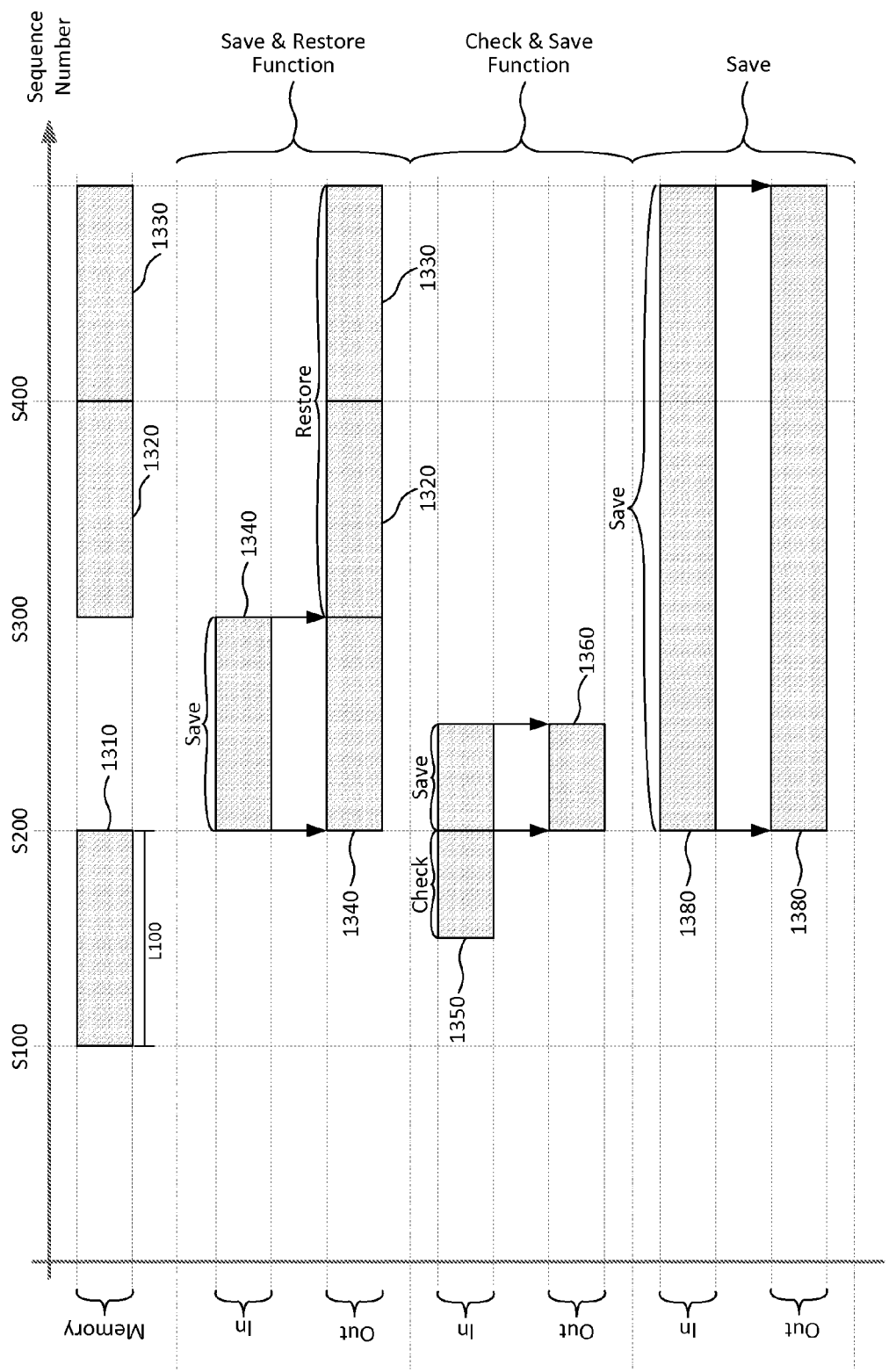
Figure 15:
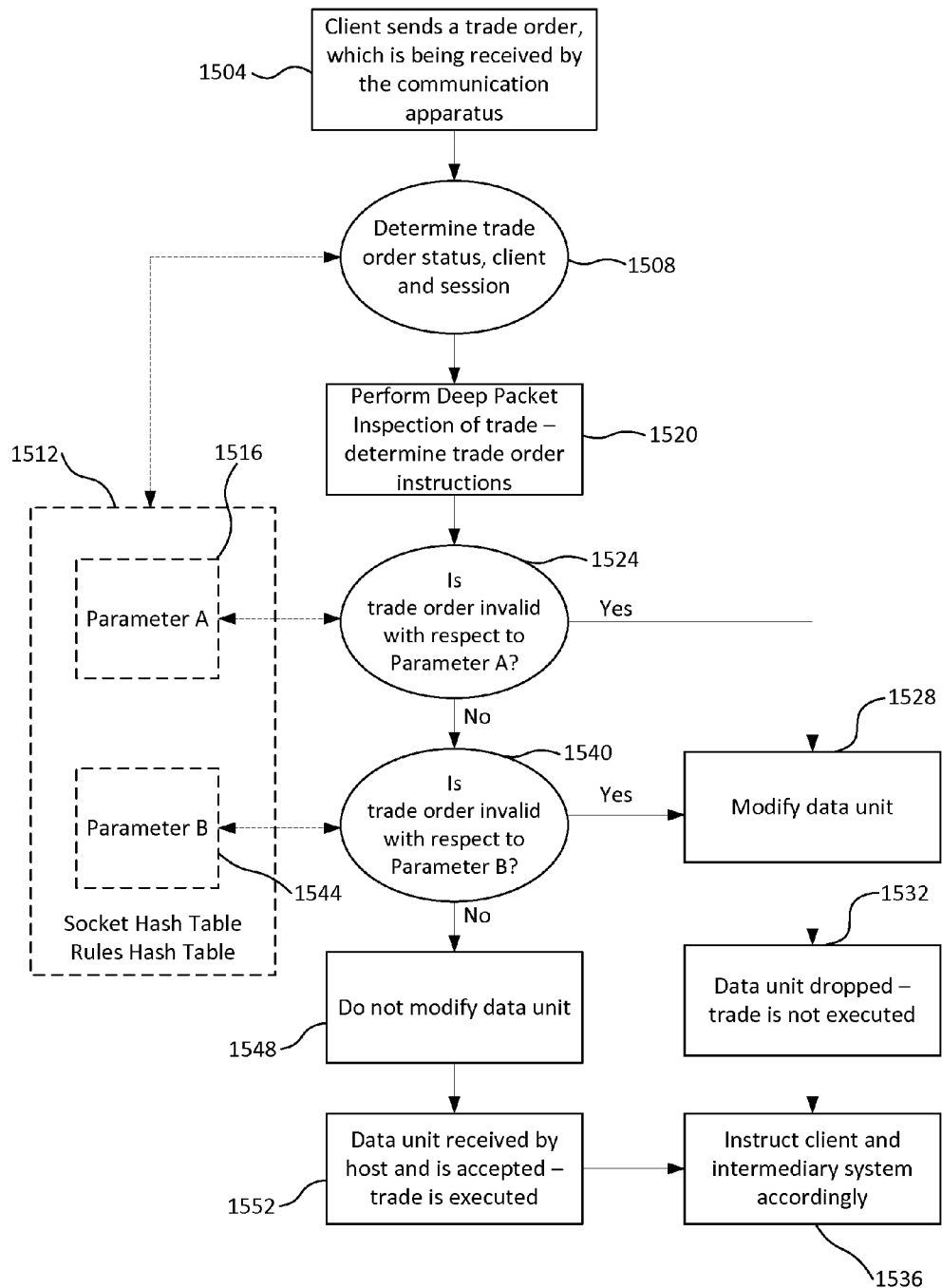
Figure 16:
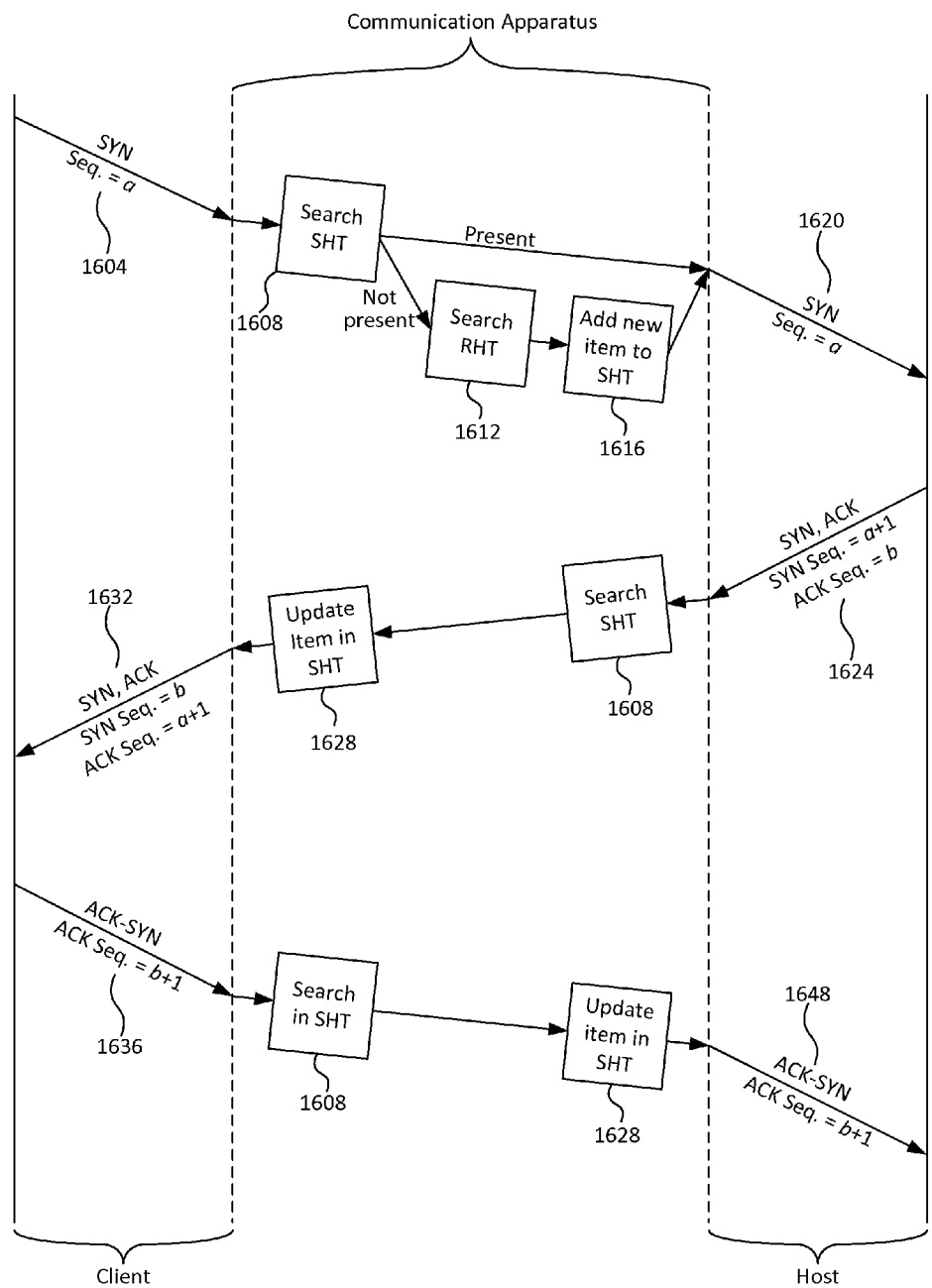
Figure 17:
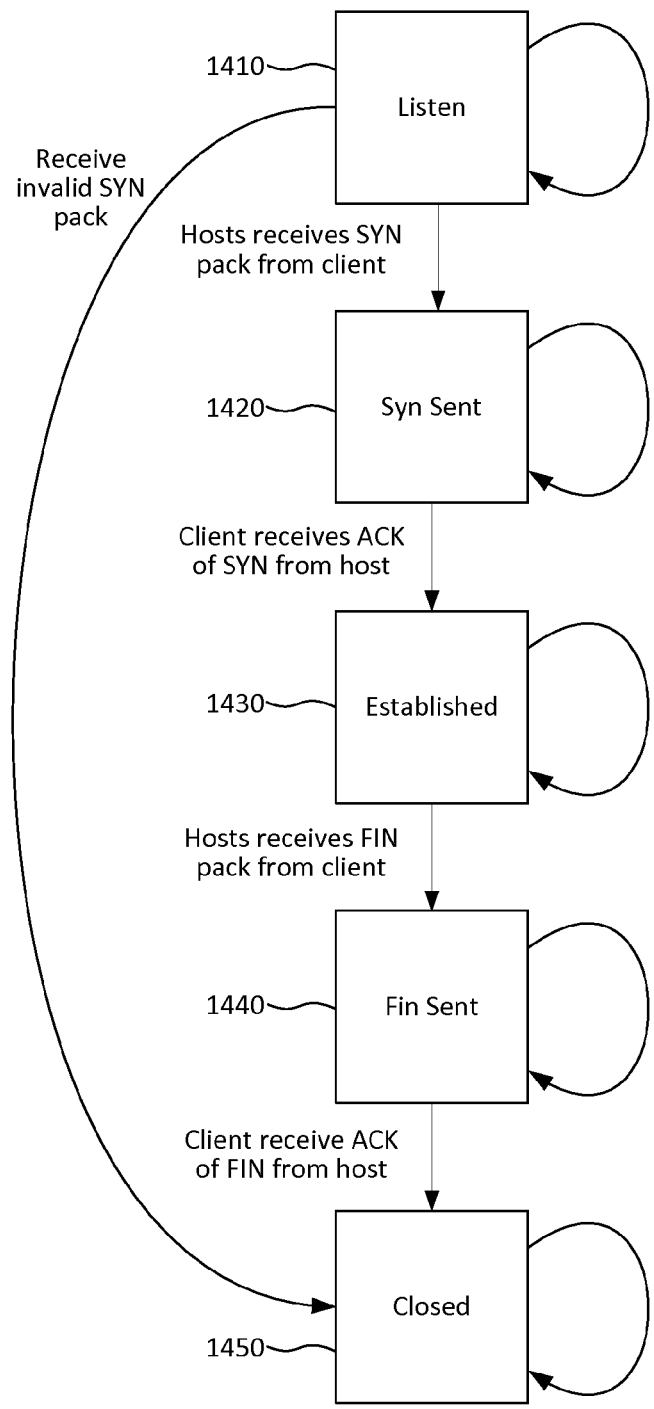
Figure 18:
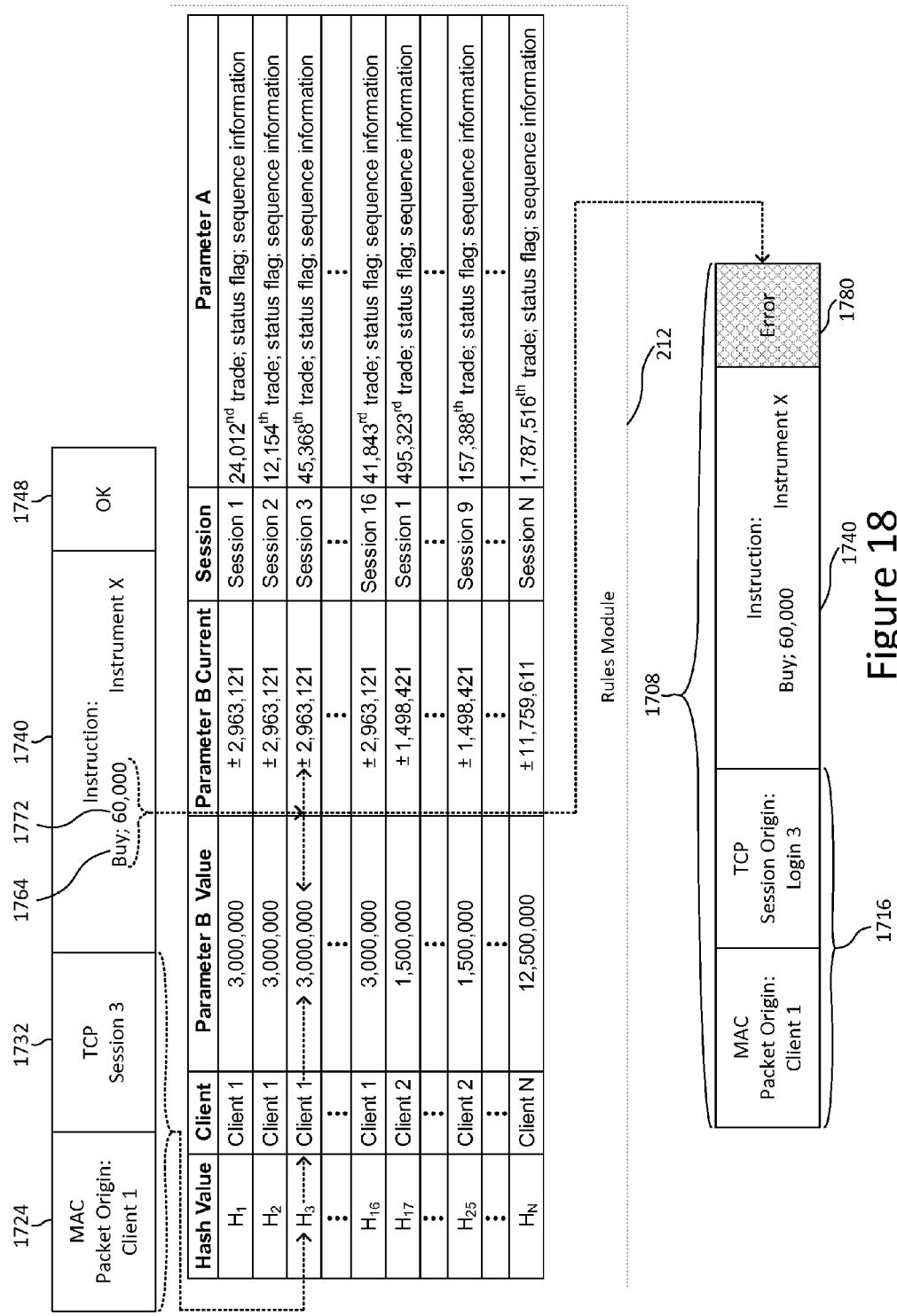

FIGS. 6 to 10 schematically illustrate various examples of the operation of the communication apparatus on a time axis;

FIG. 11a shows a flow diagram of in-sequence and out-of-sequence data unit processing by the communication apparatus;

FIG. 11b shows an algorithm for processing incoming data units;

FIG. 12 shows a save function as executed by the communication apparatus during retransmission;

FIG. 13 demonstrates retransmission of data from memory;

FIG. 14 shows exemplary functions that the data unit flagging module executes;

FIG. 15 is a process flow diagram illustrating data unit status determination by the communication apparatus;

FIG. 16 illustrates a three-way handshake between client and host via the communication apparatus;

FIG. 17 shows an exemplary process flow for a network protocol for establishing and closing a TCP network connection; and FIG. 18 shows example information used by the communication apparatus to determine whether a data unit is to be flagged.

DETAILED DESCRIPTION OF THE INVENTION

Figure 1:
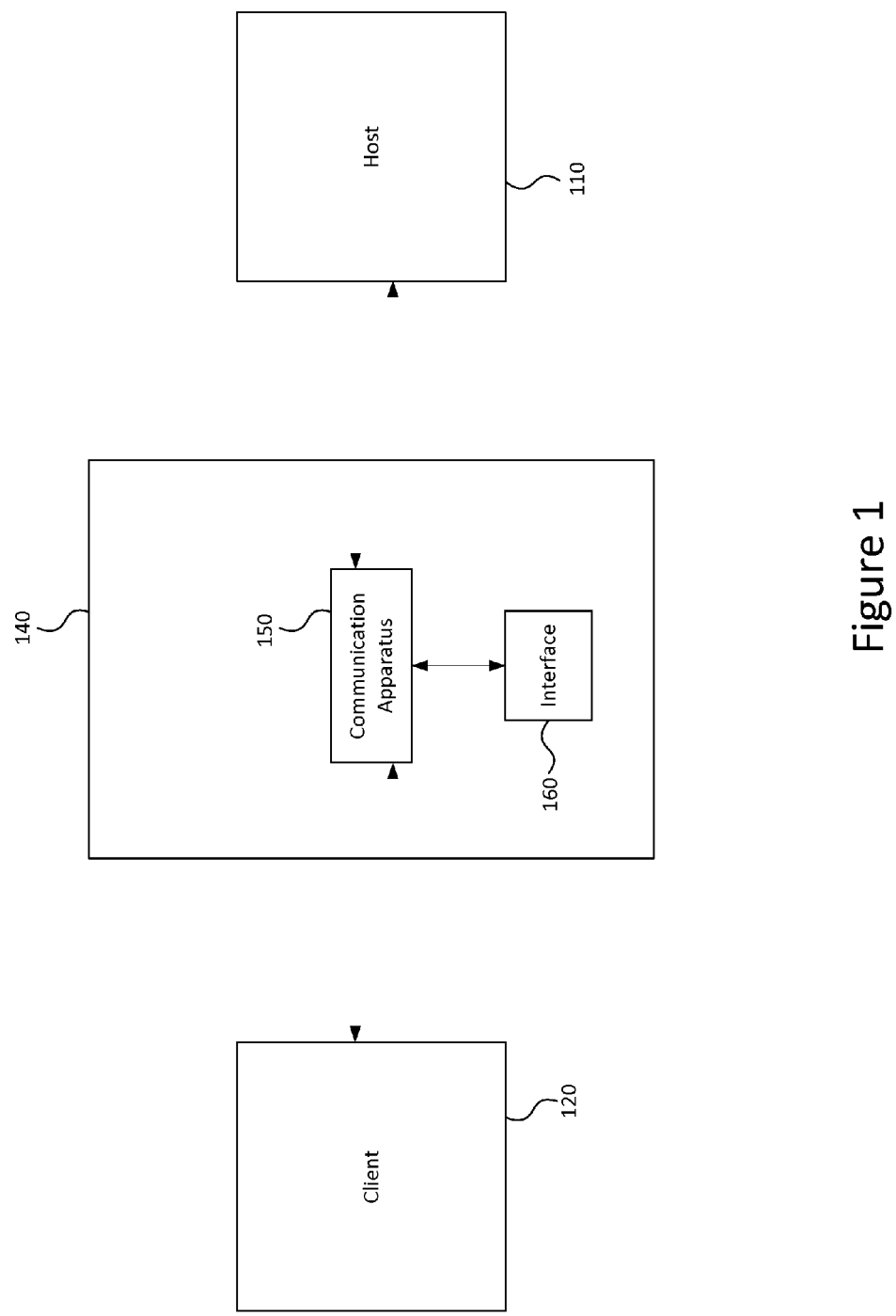
FIG. 1 shows a communication system.

FIG. 1 shows a communication system incorporating at least two network entities—a host 110 and a client 120—in communication with one another via a communication network. As illustrated, communications between the client 120 and the host 110 are intercepted by an intermediary entity 140. The intermediary entity 140 comprises a communication apparatus 150. The intermediary entity 140 additionally comprises an interface 160 in communication with the communication apparatus 150. The network is such that information can pass from client 120 to host 110 via the communication apparatus 150, and/or host 110 to client 120 via the communication apparatus 150. The communication apparatus 150 is configured such that it enables low-latency communication between client 120 and host 110.

The communication apparatus 150 intercepts communications between the networked client 120 and host 110 so as to execute auxiliary functionality, such as data processing, routing, mining, manipulation, modification, inspection, flagging, filtering or any other similar processes.

In an example of the system shown in FIG. 1, the host 110 is in the form of a financial exchange, the client 120 is in the form of a financial trading institution, such as a high frequency trading firm or indeed a single workstation of the firm, and the intermediary entity 140 is in the form of a broker, such as an investment broker. In an alternative example of the system, the client can be any number of workstations, the host a remote server and the intermediary entity an Internet Service Provider, cyber security body or any other such similar intermediary.

A single communication apparatus 150 is shown in FIG. 1, however a plurality of such apparatuses can further populate the example, in addition to any number of clients and/or hosts which can communicate with one another via the plurality, or indeed single, communication apparatus 150.

Figure 2:
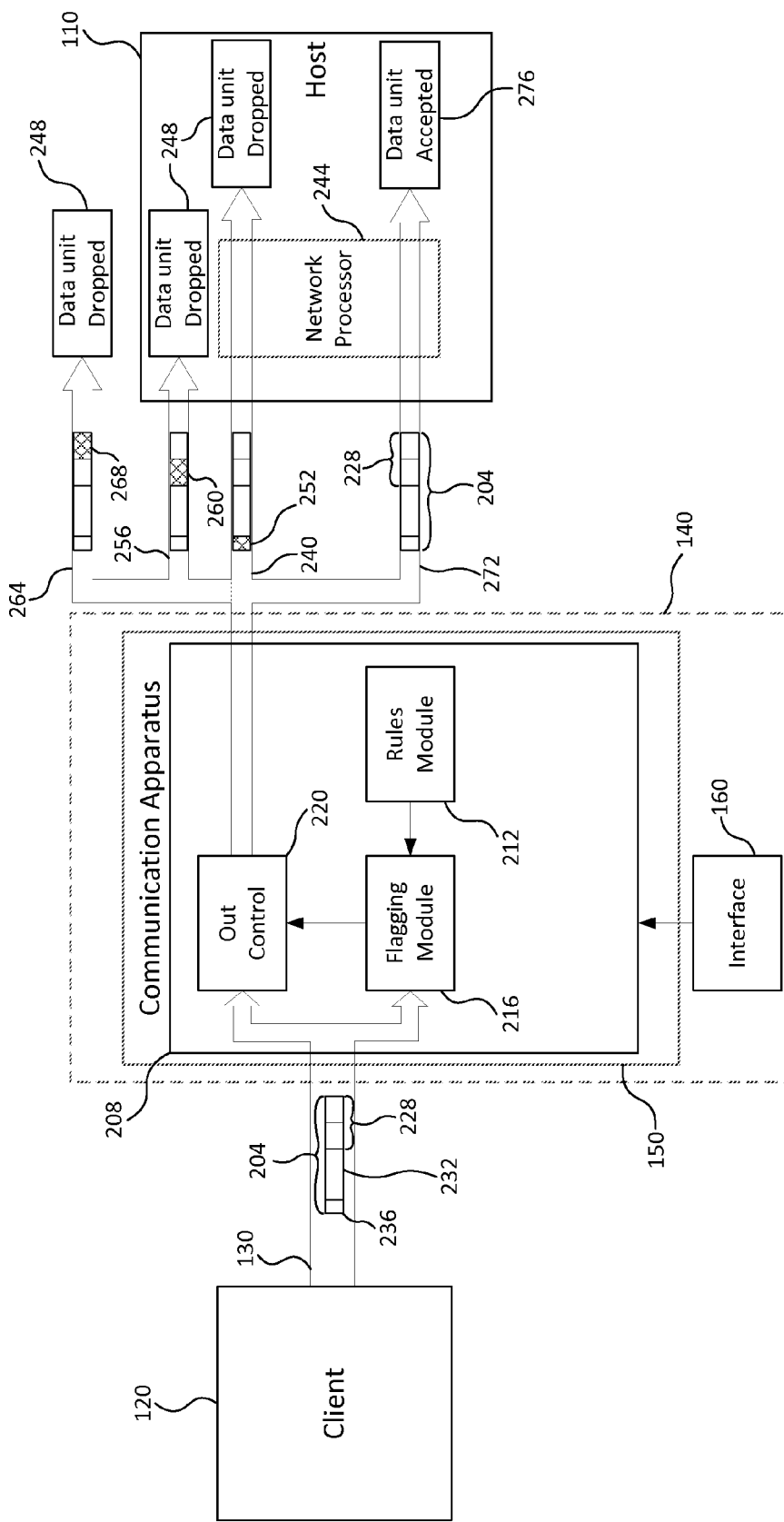
FIG. 2 shows a schematic diagram of the architecture and function of a network communication apparatus.

FIG. 2 is a schematic illustration of an example of the architecture and functions executed by the communication apparatus 150 within the networked system shown in FIG. 1. A data stream comprising data units 204 in the form of Protocol Data Units such as packets, datagrams, segments or frames, is sent from a client 120, by means of the network, bound for the host 110 via the intermediary entity 140. The data units 204 include a number of bytes or subunits such as a plurality of bits, where the plurality of bits are processed within one or more clock cycles of the apparatus. The intermediary entity 140, and hence the communication apparatus 150, receives data units 204 as the byte elements or subunits of the data units arrive in a byte-wise fashion. The communication apparatus 150 duly submits the byte elements of the data unit to the communication apparatus processor 208 for processing. The communication apparatus processor is configured to perform a determining step based on the contents of the incoming data unit 204 and a regimen outlined in a rules module 212. As data unit 204 bytes are being received by the communication apparatus 150 processor 208, the bytes are simultaneously relayed to a flagging module 216 and an out control module 220. The rate at which bytes enter the apparatus can be equal to the rate at which bytes are output from the communication apparatus. However, the communication apparatus is configured to operate regardless of the network structure between the communication apparatus 150, client and host. For example, the network structure between host and communication apparatus 150, such as 10 Gigabit Ethernet, can be different from the network structure between client and communication apparatus, such as 1 Gigabit Ethernet. This improves the communication apparatus's compatibility with client and host networks. The effect on latency due to client and host network speed mismatch is negligible if the rate at which network data units are received by the communication apparatus is less than or equal to the rate at which the data units can be transmitted. Generally, in order to minimise latency, the use of the fastest possible network structures and interface is desirable.

The determining step occurs at the flagging module 216, present within the processor 208. As will be described in further detail below, the determining step comprises a consultation of the rules module 212 by the flagging module 216 based at least in part on an inspection of the relevant information within the data unit 204. Subsequently, the determination of validity of the data unit made by the flagging module 216 serves to instruct the out control module 220.

While the determination step is occurring, the byte elements or subunits of the data unit are simultaneously forwarded on, byte-wise as they are being received, from an input of the communication apparatus to the out control. There is no buffering or serialisation delay at the level of the communication apparatus.

Operations such as forwarding, submitting, processing, determining, etc. occur simultaneously when a byte or subunit of an incoming data unit arrives. The byte or subunit is added to an accumulation of bytes or subunits for processing, forwarding, submitting, determining, etc. and without any delay dependant on the incoming data unit's size, size of any element or other logical block of information of the data unit therein i.e. there is no buffering or serialization delay at the level of apparatus.

The determination step occurring at the flagging module 216 occurs simultaneously with the operation of the out control module 220, which sequentially processes and then forwards each byte or subunit of the data unit 204 from the communication apparatus 150.

The flagging module determines whether or not to inform the out control 220 to modify the data unit 204 such that a data unit identified by the flagging module is subsequently "dropped" by the network, in that the data unit is not received, accepted or acted upon by the intended host 110. The modification (by a modification means) of a data unit by the out control module 220, as instructed by the flagging module 216, comprises any means of marking, identifying, distinguishing, manipulating or corrupting the data unit. Exemplary modification operations enacted by the out control 220 as instructed by the flagging module 216 include writing additional bytes with a recognised meaning within the network stack, such as blacklisting the data unit, manipulating a data unit's control information, such as headers 228, trailers, payload data 232, checksum 236, Cyclic Redundancy Check (CRC), security checks or any other component which ensures that the data unit is subsequently dropped by the network. The out control module 220 outputs bytes of the data unit 204 regardless of the instruction from the flagging module 216. If the determination is made to modify the data unit, which subsequently results in the data unit being dropped by the network, the communication apparatus will modify the portion of the data unit which has not yet been output in such a way that further along the network, for example at the point of a host switch or Ethernet card, the entire data unit will be dropped, including the portion of the data unit which has been transmitted from the communication apparatus before the modification of the data unit. If a determination has yet to be made regarding the validity of the data unit as the portion of the data unit which can be modified such that the data unit is dropped by the network is being output from the communication apparatus 150, the data unit is corrupted regardless, thus preventing a potentially invalid data unit from being transmitted. The data unit can be re-processed with a delay which will allow the determination to coincide with the output of the element of the data unit which can be modified and subsequently re-transmitted.

An example means of ensuring that a data unit is dropped by the network is illustrated in FIG. 2, where a data unit 204, comprising multiple headers 228, payload data 232 and/or a trailer in the form of a checksum 236 or CRC, is flagged by the flagging module 216 as being invalid, which causes the communication apparatus out control 220 to modify the data unit such that the data unit is sent to the intended host and correct port within the host, but which then identifies the data unit as being invalid as determined by the host's network processor 244, such as a network card or CPU, with respect to the network protocols. The data unit is thereby duly dropped by the host 248. In this example, the flagging module 216 instructs the out control 220 to manipulate only those components of the data unit which do not represent the data unit's network destination, including host and port. Instead, validity markers such as the data unit's checksums or CRCs are manipulated 252 such that the host processor 244 presumes that the data unit is invalid or erroneous and drops the data unit 248. The process of the flagging of the data unit extends to other methods of instructing or commanding the out control, or generally a module for data unit modification, to alter subsequent network handling of the data unit. The out control can only modify elements of the data unit 204 which have not yet been forwarded from the out control module 220 upon receiving instruction to modify from the flagging module 216; as such bytes which are forwarded from the output module last are most appropriate for modification, including checksums and CRCs, since this provides the flagging module time to receive and complete its determination step without having to withhold or delay the continuous flow of data unit bytes or subunits through the apparatus 150.

In one example, in order to synchronise the possible modification of elements of the data unit prior to their output from the out control module 220, with the determination step completed by the flagging module, a delay is introduced to the data unit byte stream being received by the out control. The delay is typically independent of the size of data unit 204 as a whole or any element or combination of elements of the data unit. Furthermore, the delay is incurred in discrete clock cycle units, and is therefore of the order of nanoseconds.

Alternative examples of modification to different elements of the data unit 204 are also shown in FIG. 2 and rely upon the out control 220, as instructed by the flagging module 216, to modify elements of the data unit which are normally first received, or at the very least received before the start of payload data 232, by the out control module 220 and hence the first to be forwarded from the out control. Modification of these elements of the data units is typically not employed since this would require the determination step to be completed with only the bytes which have been received—those before the payload data. Such a mechanism is applicable, for example, for data unit filtering for cyber security and denial-of-service operations, where control information, including a data unit's destination or origin information, of the data unit is a sufficient amount of information to complete the determination step.

In one example, destination determining data unit elements are modified so that the bytes of the data unit are output 256 to the correct host, but incorrect port at that host, subsequently resulting in the data unit not being considered and it effectively being dropped by the network. As an example, such a modification operation can involve manipulation of the port header 260 which directs the data unit to the correct port within the correct host, for example for a MAC/TCP/IP network, the TCP header. In this instance, the out control's 220 modification operation manipulates the TCP header of the data unit, prior to the TCP header being forwarded, such that it is invalidated, corrupted or distinguished from an acceptable host port and results in the data unit being dropped 248 by the host. Generally, manipulation of the transport or network layer control information of the data unit will affect this.

Further still, FIG. 2 shows that the out control module 220 can enact a modification operation on elements of the data unit 204 which ensure that the data unit is sent 264 to an invalid host destination. The data unit can be considered to have been dropped 248 from the network system in this eventuality 264. As an example, such a modification operation can involve manipulation of the physical layer header 248, which directs the data unit to the correct host (typically layer two of the OSI model, also referred to as the (data) link layer). For example, in a MAC/TCP/IP network, this would correspond to the MAC header. A further example might involve the manipulation of the Logical Link Control (LLC).

The aforementioned examples, wherein elements of the data unit 204 which are received prior to the payload data being manipulated, are undesirable if the flagging module's determination step requires information from the data unit's 204 payload as per deep-packet inspection (e.g. by inspection of the payload data, that is, at the level of the "application layer" of a data unit).

A data unit 204, which is determined to be valid by the communication apparatus, is not flagged by the flagging module 216, as such the output control does not apply any modifications or manipulative operations on any element of the data unit being output.

The data unit 204 is output 272 from the communication apparatus in the same form in which it was received. The data unit is sent to the originally intended host 110 and host port, duly processed by the host's network processor 244 and determined as being a valid data unit and accepted 276 by the host.

In a specific example of FIG. 2, the host 110 is in the form of a financial exchange, the intermediary entity 140 is a broker and the client 120 is in the form of a client of the broker, such as a financial trading institution. Typically, the system is arranged to apply the communication apparatus functionality to dataflow from the client to the host. The system can also operate as described above for data streams from host to client in any example of the system as represented in FIGS. 1 and 2.

Generally, the system described in FIG. 2 requires the modification or manipulation of a data unit to distinguish a valid data unit from an invalid data unit such that an invalid data unit is subsequently "dropped" by the network, in order to facilitate low latency network communication. Alternatively, physical level signals are used to interrupt data unit transmission such that the host 110 treats a data unit as invalid.

Figure 3:
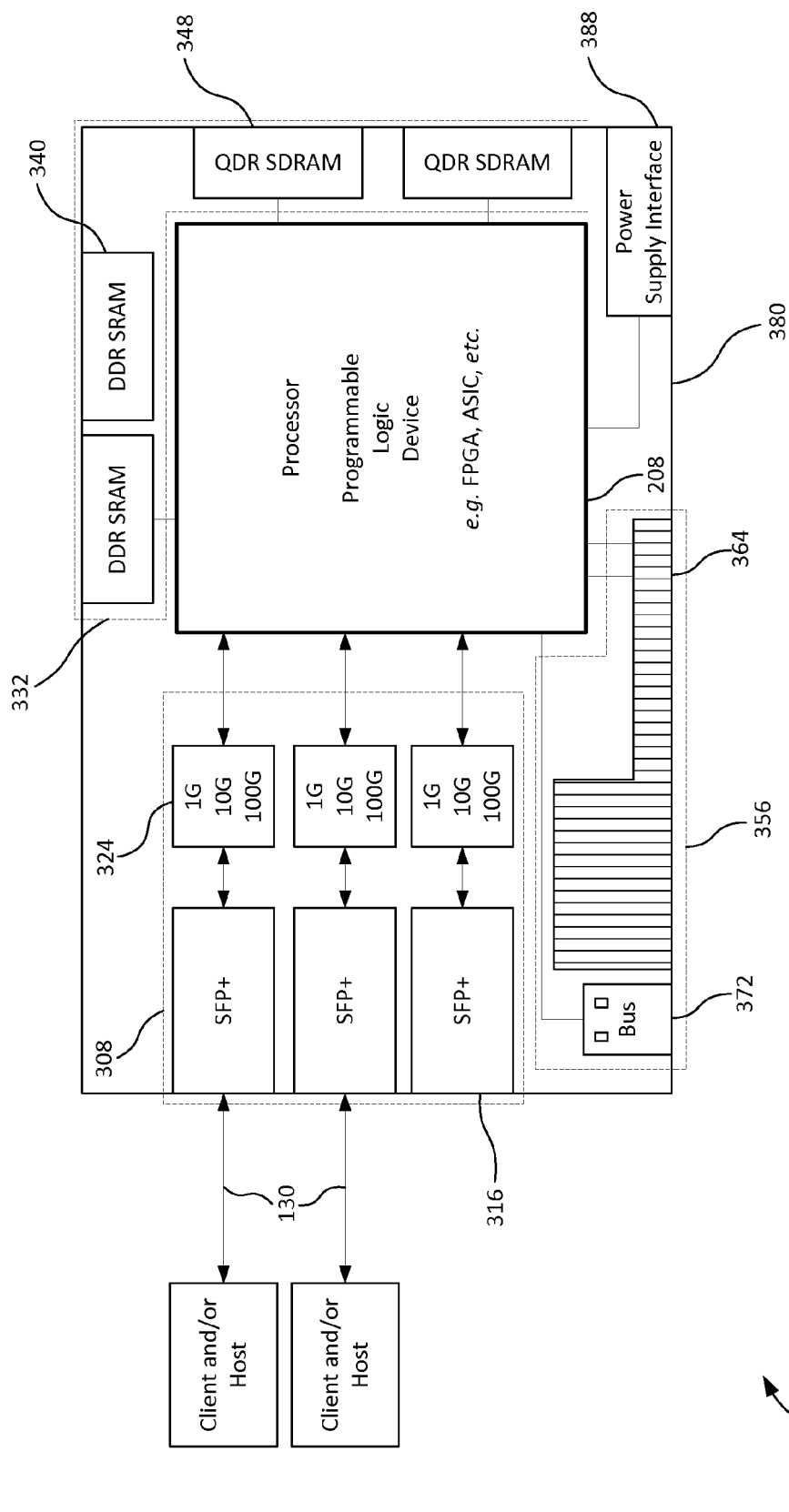
FIG. 3 shows the hardware structure of the communication apparatus of FIG. 2.

An exemplary schematic illustration of the communication apparatus hardware is shown in FIG. 3. The communication apparatus 150 comprises any number of physical network input/outputs 308 with which communication 130 to the client 120 and/or host 110 is facilitated over the network. For example, in the case of an Ethernet network between host, communication apparatus and client, Small Form-factor Pluggable transceivers (SFPs) and/or enhanced SFPs (SFPs+) 316 can act as the interface for the communication apparatus 150 over an Ethernet network physical layer. Infiniband-based networking and alternative physical networks are also possible. Furthermore, any other communication interface type, which can further be adapted to support the network structure between client, communication apparatus and host, can be employed by communication apparatus 150. At least one of the communication apparatus's interfaces can match the client or host network structure specifications. In the case of a financial exchange being a member of the network system shown in FIG. 1, the type of connectivity is most likely 1 Gigabit or 10 Gigabit Ethernet, the client and the intermediary entity, such as the financial trading institution and broker respectively can agree the standard of the network structure over which they communicate. This can be any variety of networking means including a Peripheral Component Interconnect express (PCIe) bus connection from a client workstation, such as a PC, to the communication apparatus 150 in a form of PCIe card, Low-Voltage Differential Signalling and/or Hyper-Transport interfaces between client and communication apparatus processors.

The aforementioned network system, can therefore support high-speed data transfer means, such as 1 Gigabit Ethernet (GbE), 10 GbE, 40 GbE, 100 GbE, fibre optic channels, a Peripheral Component Interconnect express (PCIe) or other bus, LVDS, chip-to-chip communication, on-chip communication and/or any other similar systems. A plurality of network interfaces can be present on the communication apparatus thereby allowing access from multiple network hosts/clients and distribution to multiple clients/hosts via the communication apparatus. Chip-to-chip communication means, such as LVDS or similar, can be employed between client, intermediary system and/or host. This can reduce overall system latency, in particular the communication apparatus's latency, by reducing the light path between network entities and the network structure data rates. Furthermore, latency reduction-owing to streamlining of network protocols, functions and data units is operable by using network communication methods which eliminate, partly or completely, the need for a physical layer or any other signal pre-processing, such as demodulation, error-correction, serialization on physical layer, etc., before a data unit enters the communication apparatus 150 thus decreasing latency further towards zero.

Network signals received by the communication apparatus 150 at the network interfaces 308 are processed at the physical layer, by a physical layer processing module 324, arranged to processes, for example 1 GbE, 10 GbE, 100 GbE or similar means.

The communication apparatus's input/output physical network layer processing modules 324 are in communication with the communication apparatus processor 208, thereby permitting received data units to be processed for output. The communication apparatus processor 208 comprises a reconfigurable Programmable Logic Device (PLD) 208. It is appreciated that a variety of different PLDs exist, in the case of low/ultra-low latency applications, PLDs with fast logic are implemented, such as Application-Specific Integrated Circuits (ASICs) and Field-Programmable Gate Arrays (FPGA). The frequency with which reconfiguration of the PLD is required determines the best choice of PLD. In one example, an FPGA is used to combine low latency and reconfiguration versatility. The PLD is configured to execute processing (including network processing), manipulation, data unit corruption, deep-packet inspection, "cut-through" switching, filtering and/or flagging of data units as they are passing through the communication apparatus. The rules module 212 and flagging module 216 illustrated in FIG. 2 are implemented in hardware within the PLD, optionally in combination with the external memory 332. The PLD also incorporates a TCP offloading engine.

Figure 4:
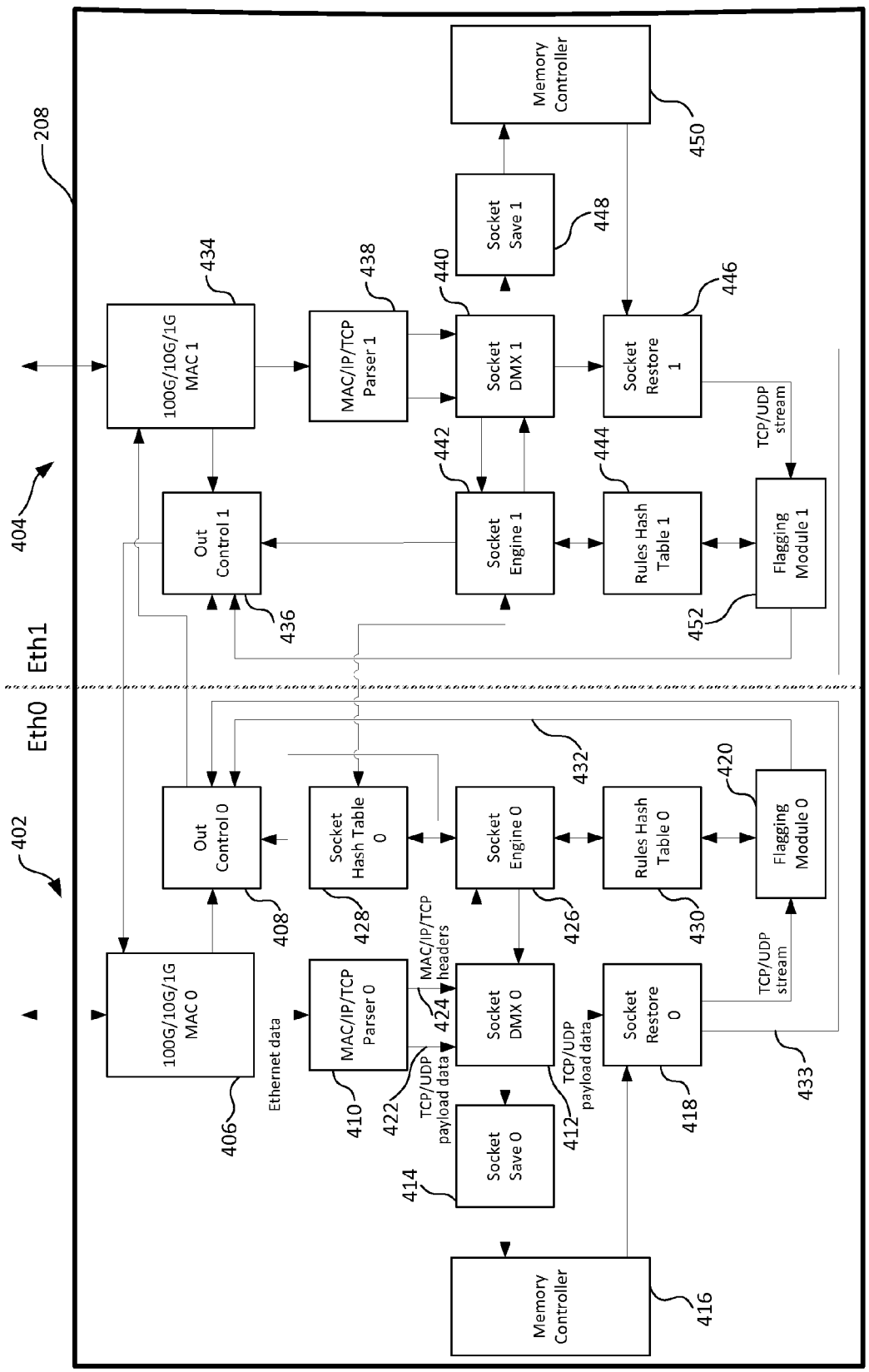
FIG. 4 illustrates schematically the logical architecture of the communication apparatus of FIG. 2.

A plurality of external memory components 332 on the communication apparatus 150 are in communication with the PLD 208. The external memory components comprise any number of low latency dynamic external memory modules; this allows rapid access to stored data—typically low volumes—by the PLD. Low latency memory components such as Double Data-Rate Synchronous Dynamic Random-Access Memory (DDR SDRAM) 340 are illustrated in FIG. 4 as an example. The external memory component also comprises any number of Static Random Access Memory (SRAM) modules, such as Quadruple Data-Rate (QDR) SRAM 348, as illustrated, which are also in communication with the PLD. Generally, the external memory components 332 can encompass any means of data storage, including Flash memory, wherein the data packages can be stored and retrieved.

A range of non-network input/outputs 356 allow the communication apparatus to connect to peripheral hardware and interfaces, such as the intermediary entity (user) interface 160. For example any number of computers or servers can be connected via a bus, which can include any number of PCI express buses 364, though any form of hardware interlink can be present such as a Universal Serial Bus (USB) 372 and their use depends on the requirements of data transfer to the linked hardware. Interlinked peripheral hardware also comprises an interface for system management, reconfiguring of the PLD 208, manipulating the rules module 212, flagging module 216 or any further component of the PLD. In addition, further memory can be connected to the communication apparatus 150 via a bus, to store large volumes of network data or data not immediately required by the communication apparatus. In particular long-term network traffic monitoring can be afforded by virtue of peripheral memory connected to the communication apparatus via a bus. Displays, CPUs and other peripheral hardware can also be linked to the communication apparatus via a bus or similar non-network input/output 356.

The communication apparatus 150 is arranged on a circuit board 380 and is powered from an external power supply via a power supply interface 388, for example via a PCIe slot in the case where the circuit board 380 is in the form of a PCIe card.

In one example, the communication apparatus 150 also comprises input/outputs for Mezzanine Cards (MC), such as high-speed and FPGA MCs, coaxial connectors, such as SubMiniature version A (SMA) connectors, and transceivers.

The communication apparatus 150 can be part of a network card with client and/or host systems present on that same network card and/or locally connected, e.g. via a bus or chip-to-chip communication means. It is possible for the client server to be present locally on the communication apparatus, including as part of the same network card, at the intermediary entity and remote from the client entity, the same can apply for the host server. For example, a broker network card with an integrated communication apparatus 150 communicating with an exchange can execute risk management for orders originating from a client, e.g. trading institution, server on the network card. The absence of client physical access to the server can be advantageous since it prevents a client from physically replacing or modifying the network card, in particular the constituent communication apparatus, such that the broker's risk management is bypassed or modified.

The network card can feature any number of PLDs; with a plurality of the PLDs offering the functionality of the communication apparatus, client and/or host. For example, a network card with two PLDs, such as FPGAs or ASICs, can have a first PLD executing functions described herein which pertain to the communication apparatus 150 and a second PLD, in communication with the first, used by the client to execute client-defined programmed logic and issue financial trade orders.

The broker can connect the network card within a client server, for example using a SFP+ port, allowing the client to communicate with the network card. A second SFP+ port can be used for broker monitoring and configuration of limits via an interface. A network data unit sent by a client via the network card is assessed as per the operation of the communication apparatus. However, the client's data unit originates from inside the client server, for example over a PCIe bus or from the second PLD operated by the client, to the broker's PLD, across chip-to-chip communication means, such as LVDS lines.

FIG. 4 illustrates schematically the logical architecture of the communication apparatus PLD 208. For the purpose of this example, the operation of the PLD is delineated into two logical segments—Eth0 402 and Eth1 404. Eth0 402 is the segment which receives and forward incoming network data units, for example, a data unit originally sent from the client towards the host. Eth1 404 is the corresponding interface configured to forward data units, received from the host and bound for the client, with minimal delay. Generally, the PLD comprises network processing logic, a flagging module, out control and memory controllers.

The following refers to network data unit processing on the Eth0 402 segment of the PLD 208 of the communication apparatus, with reference to FIG. 4. Data units are received from the network at a first PLD network interface module 406 (receiving means) on the Eth0 402 segment. For example, the PLD network interface module 406 takes the form of logic able to process inbound data units at header and/or checksum level to determine if the data unit has been validly received. The data unit includes control information based on various network protocols such as MAC, IP, TCP or UDP network protocols. A stream of data units from an Ethernet network is processed at this first PLD network interface 406.

The data unit being received has its bytes directed or forwarded to a first module 408 (forwarding means). The first module is an out control module 408 on the Eth0 segment, which processes data units for output and manipulates or modifies flagged data units such that they are subsequently dropped by the network. The data unit bytes are also directed to a second module 410, in the form of a data unit parser. The out control 408 receives data unit bytes with little to no delay, but induces delays in outputting data unit bytes (in clock cycle units, with respect to the instance when the data unit is received by the parser 410), in dependence upon the parsing of an incoming data unit, for example if a data unit is received out-of-sequence. The delay is such that the time taken to receive and process (e.g. at the out control 220) the data unit up to the element of the data unit to be modified (such as the trailing checksum or CRC) is equal to the time taken for the data unit to be received up to the element which is required to complete the determination step of the flagging module, time for the flagging module to complete the determination step and instruct the out control 220. The delay provides synchronisation between the output of the data unit (up to the element of the data unit to be modified, e.g. checksums and CRCs) and instruction from the flagging module (as to whether or not to modify that element of the data unit which is to be modified). The time required to process the data unit at the out control module and flagging module does not include the time to receive the entire data unit since the data unit flows bytewise from input to the out control module and input to the flagging module. The delay incurred is not dependent on data unit size.

The forwarding of the data unit as it is being received to both the out control 408 and parser 410 effectively results in the "cut-through" processing of the data unit, whereby the forwarding on (or onward transmission) of the data unit commences before the data unit has been fully processed or even fully received. This allows the data unit to be simultaneously output at the out control 408 while being processed for flagging. This serves to reduce the latency of the system over conventional approaches, which serially process and then output a data unit.

The parser module 410 receives the data unit bytes from the Eth0 PLD network interface module 406 and parsers the data unit. This parsing typically strips off any or all of the headers of the data unit, up to the transport layer, that is, the MAC/IP/TCP headers. The data unit payload data and headers are hence separated from one another for subsequent processing. The payload data bytes 422 and data unit header bytes 424 are separately parsed from the parser module 410 to a socket Digital MultipleX (DMX) module 412.

The data payload output from the socket DMX module 412 is forwarded to a socket save module 414, wherein the payload data is processed for storage in memory components in the PLD and/or external memory components 332. The data units processed for storage by the socket save module 414 are duly issued to a memory controller 416, which works to distribute and store data units to memory accordingly. The data unit is dispatched to a socket restore module 418, which allows data stored in memory components to be accessed, preferably with minimal latency. Data units assigned to memory components are stored for future retransmission if unintended errors occur when transmitting data units or in order to check TCP retransmitted data units and to facilitate re-arrangement of out-of-sequence data units.

A further stream of payload data bytes is output from the DMX module, bypassing the socket save module and memory controller such that the data unit is forwarded to the socket restore module 418 where the data unit is processed to determine whether it is to be immediately forwarded to the Eth0 flagging module 420 (or at least a portion of the data unit, such as its TCP/UDP components). A data unit determined to have been received as part of the correct sequence is immediately forwarded. In this way, data unit bytes can be streamed directly to the flagging module should the system make a determination that delaying the data unit is not necessary. Otherwise, data units which are incorrectly sequenced are restored from memory components by the socket restore module 418 and only then forwarded to the flagging module 420. A validation process to identify data units that are to be retransmitted is conducted. The socket engine issues a command so that the data unit, and in particular its payload, is inspected. The socket restore module 418, subsequently issues a command 433 to the out control 408 instructing retransmission of a previously sent data unit.

The header output 424 from the parser module 410, also received by the socket DMX module 412, is subsequently output from the socket DMX module 412 to the Eth0 socket engine 426, to which the DMX module sends requests. The socket engine 426 examines the header elements of the data unit to assist in determining data unit validity (as described with reference to the flagging module 420) and/or relevance for an opened or admissible network connection, with respect to the intermediary entity's rules (the rules being accessed from a Rules Hash Table (RHT) 430). This header information includes any network information such as data unit source and destination. More specifically, this can apply to network, client, host port, etc. addresses and any form of data link, transmission and network header, such as TCP, IP, MAC and UDP addresses amongst many others. Further auxiliary information such as sequence information of the data unit, including the last received data unit and last processed data unit, will aid in determining if the data unit has been received as part of the correct sequence.

The socket engine 426 issues commands to process, save, check or restore a data unit, and in particular the data unit's payload data 232. A command from the socket engine 426 to the out control 408 can instruct a data unit to be modified if it is determined, with reference to a Socket Hash Table (SHT) 428 and/or the RHT 430, that the data unit being output has been received as part of the incorrect sequence. In this case, the data unit is modified as it is being output such that the data unit is subsequently dropped by the network.

The processed headers, or similar, are compared against rules for determining data unit validity. The headers, or similar, are relayed from the socket engine 426 to a Socket Hash Table (SHT) 428, which allows the data unit's network addresses and other information to be used to identify a data unit's network session by relating the data unit to the client and port of origin and the accompanying rules stored in the SHT 428. The Rules Hash Table (RHT) 430 is consulted in certain circumstances as described below.

Hash tables are used as these offer a rapid, and thus low latency, means of accessing and associating such information, however, relational databases, arrays, trees, lists and look-up tables can also be used.

Having identified the rules to be applied to the data unit, a command of the applicable rules is issued from the socket engine 426 to the socket DMX 412, bound for the flagging module 420.

The data unit output from the socket restore 418, whether having been received from the memory controller 416 or not, is forwarded to the flagging module 420. The rules command from the socket engine 426 is received by the flagging module 420 and a determination made as to whether the data unit is valid with respect to the intermediary entity's rules. A determination of whether the data unit is valid is then made based on an inspection (deep-packet inspection) of the data unit's payload data. This results in a determination as to whether or not to flag the data unit, wherein the flagging of the data unit results in its modification such that the data unit will subsequently be "dropped" by the network, effectively resulting in the intended receiving device not receiving or being able to process the data unit (as described with reference to FIG. 2 above). The content of the data unit is compared with the rules applicable to the data unit, as obtained via the socket engine 426 from the SHT 428 and/or RHT 430. The flagging module 420 effectively sends a command 432 to the out control 408 instructing the out control to modify the data unit, such that the data unit will subsequently be "dropped" by the network. Otherwise, a data unit which has not been identified for modifications, either by issuing the appropriate command 432 to the out control 408 or no command at all, is not modified and so it is not "dropped" by the network. In one example, the flagging module 420 issues commands to the out control 408 once the data unit has been processed; the out control 408 corrupts and retransmits the data unit until a command is received from the flagging module 420. In both cases the data unit is output from the out control 408 and passed to the Eth1 PLD network interface module 434 wherein the data unit is output from the PLD 208 and communication apparatus 150, via the physical network input/outputs 308 to the network.

Simultaneously, the determination of the data unit flagging module 420 is received by the RHT 430, socket engine 426 and/or SHT 428 such that dynamic rules—rules which are dependent on historical transmission of data units in the network (whether dropped or not)—can be updated, changed or the result of the determination step recorded.

A data unit being received by the Eth1 PLD network interface module 434 is processed in a similar fashion to that described for Eth0, wherein like modules apply similar, if not identical operations. The data unit being received is "cut-through" to the out control 436 and parser 438. Parallel header and payload data outputs are received at the socket DMX 440. Data unit headers are output to the socket engine 442 and relayed to the SHT 428 on the Eth0 segment 402 wherein the rules applicable to the data unit as attributable according to the data unit's headers can be determined. The SHT 428 is a shared module between Eth0 logical segment 402 and Eth1 logical segment 404 such that data unit rules are centralised and applied, if needed, to all data traffic—inbound and outbound.

Similarly, the RHT 444 is also consulted to determine the rules applicable to the data unit. The RHTs 430 and 444 can also be centralised as is the SHT 428. Commands are issued to the socket engine 442 from the SHT 428 and/or RHT 444 from which the socket restore 446 determines whether a data unit being received is to be accessed from memory, as input into memory from the socket DMX 440 to the socket save 448 and on to the memory controller 450, or directly forwarded to the data unit flagging module 452. The flagging modules 420 and 452 are shown separately within the segments; however the modules can also be combined.

The flagging module's 452 determination as to whether or not to flag an incoming data unit is forwarded to the out control 436. The out control 436 manipulates the data unit if the data unit is flagged such that the data unit is dropped by the network, or does not manipulate the data unit if the data unit is not flagged. The data unit, manipulated or not, is forwarded to the Eth0 PLD network interface module 406 wherein the data unit is output from the PLD 208 and communication apparatus 150, via the physical network input/outputs 308 to the network.

Figure 5:
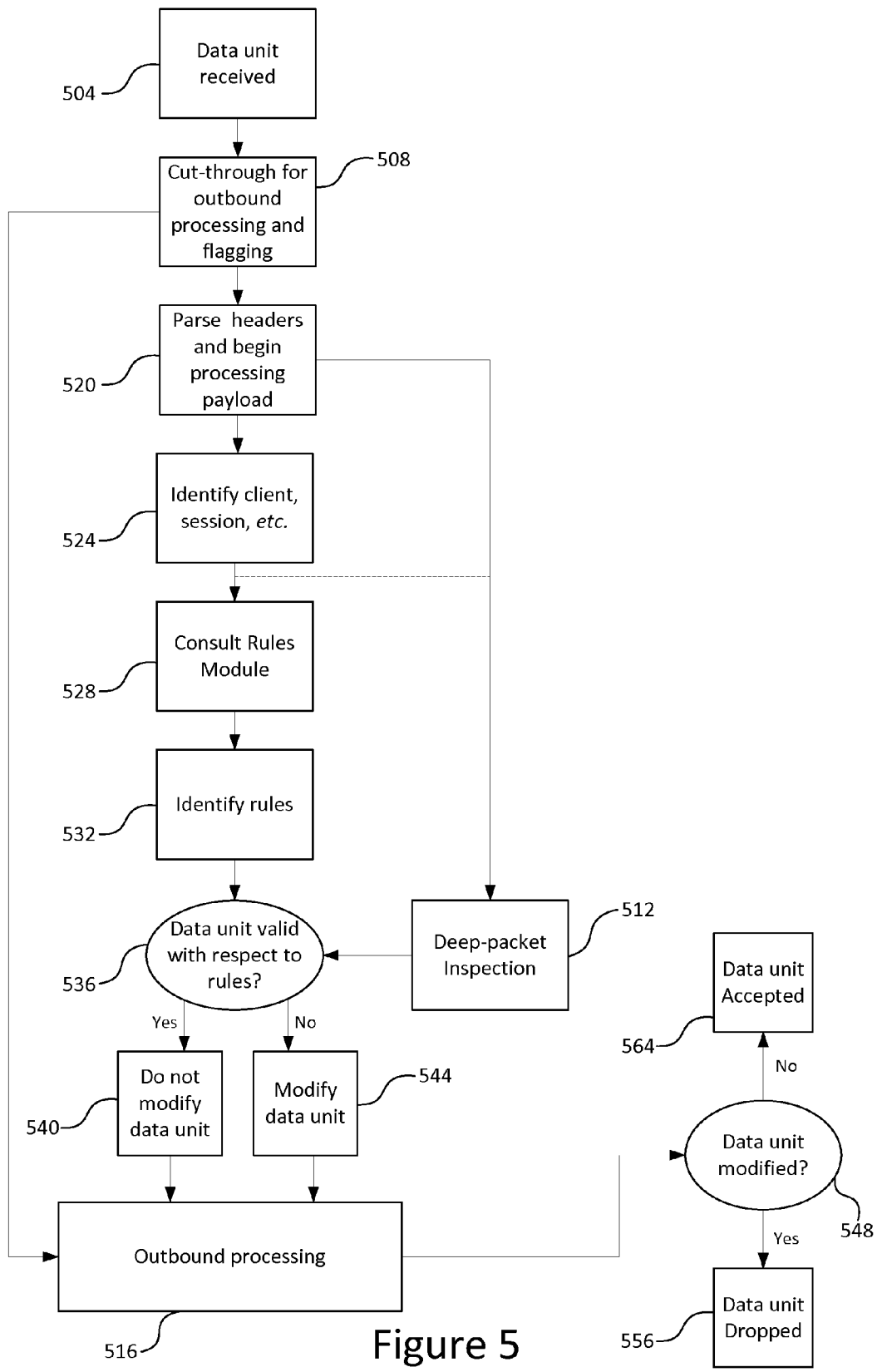
FIG. 5 shows the process of flagging unwanted data units and modifying the data units using the communication apparatus.

FIG. 5 is a process flow diagram of the operation of the PLD as described above. FIG. 5 makes reference to the architecture shown in FIG. 4, in particular, in the description that follows reference is made to the Eth0 logical segment 402 components; however the processes apply equally to the functionality provided in the Eth1 logical segment 404.

A data unit being received 504 at the communication apparatus and PLD is "cut-through" or forwarded for simultaneous outbound processing or transmission via at the out control module 408 and processing for determining the rules applicable to the data unit and whether it is to be flagged or identified 508 for modification by instructing the out control to modify the data unit. The data unit is passed in a byte-wise fashion to the out control for the outbound processing 516 of bytes as they are being received. The data unit's control information elements, such as headers, being received are processed 520 at the socket engine 426. The data unit bytes being received are subsequently transmitted byte-wise for deep-packet inspection 512 at the flagging module 420. In one example, deep-packet inspection 512 is initiated after a TCP stream has been restored with respect to the data unit sequence (this is bypassed for a UDP stream).

Once the data unit headers have been processed 520 and the headers identified 524 with respect to their origin and/or destination, (e.g. client, host and/or ports) the rules associated with the origin and/or destination of the data unit are found and consulted 528 in the rules module 212, which can include the SHT 428 and RHT 430.

In one example, the data unit payload is only forwarded for deep-packet inspection 512 after the headers have been processed 520 and the client and/or session identified 524, but before the associated rules are located and consulted 528 (as indicated by the dashed line).

The rules applicable to the data unit are then identified 532. A determination is then made at the flagging module 420 as to whether the data unit is valid 536 with respect to the identified rules 532; the relevant contents of the data unit having been extracted (deep-packet inspection) 512. If the data unit is valid, the data unit is not flagged for modification 540. The flagging step comprises the identification of whether the data unit is to be modified and relaying that instruction to the out control, which is continuously outputting the data unit. If the data unit is valid the data unit is not earmarked by the flagging means for modification and output in an unmodified form. If the data unit is not valid, a command from the flagging module instructs the out control to modify the data unit 544.

The stages from the header and payload processing step 520 to not modifying 540 or modifying 544 the data unit are synchronised to coincide within approximately the time taken to perform the steps from "cut-through" processing of the data unit 508 to completion of the outbound processing 516 up to the element of the data unit which is to be modified if the data unit is identified as being invalid. Typically these simultaneously occurring process branches are configured to complete within 400 ns-10 ns of each other, although it is also possible for this to be achieved in as little as 100 ns-5 ns and exact coincidence is also possible. Of course, the completion times of these processes are dependent on the nature of the system and network as a whole, and may require approximately 1.5 µs-0.4 µs.

Once the entire data unit has been output it is either dropped or not dropped by subsequent network processing entities. A determination is made as to whether the data unit has been modified 548, if the data unit has been modified during outbound processing 516 prior to output from the communication apparatus 150 the data unit is subsequently dropped 556 from the network because: it does not reach the intended host or port; it is invalidated with respect to the data unit's trailer (such as its checksum or CRC elements); or the payload data is corrupt.

If the data unit is not modified during outbound processing and the data unit is forwarded to the intended recipient as originally input into the communication apparatus 150. The data unit will therefore be accepted by the recipient 564.

Figure 6:
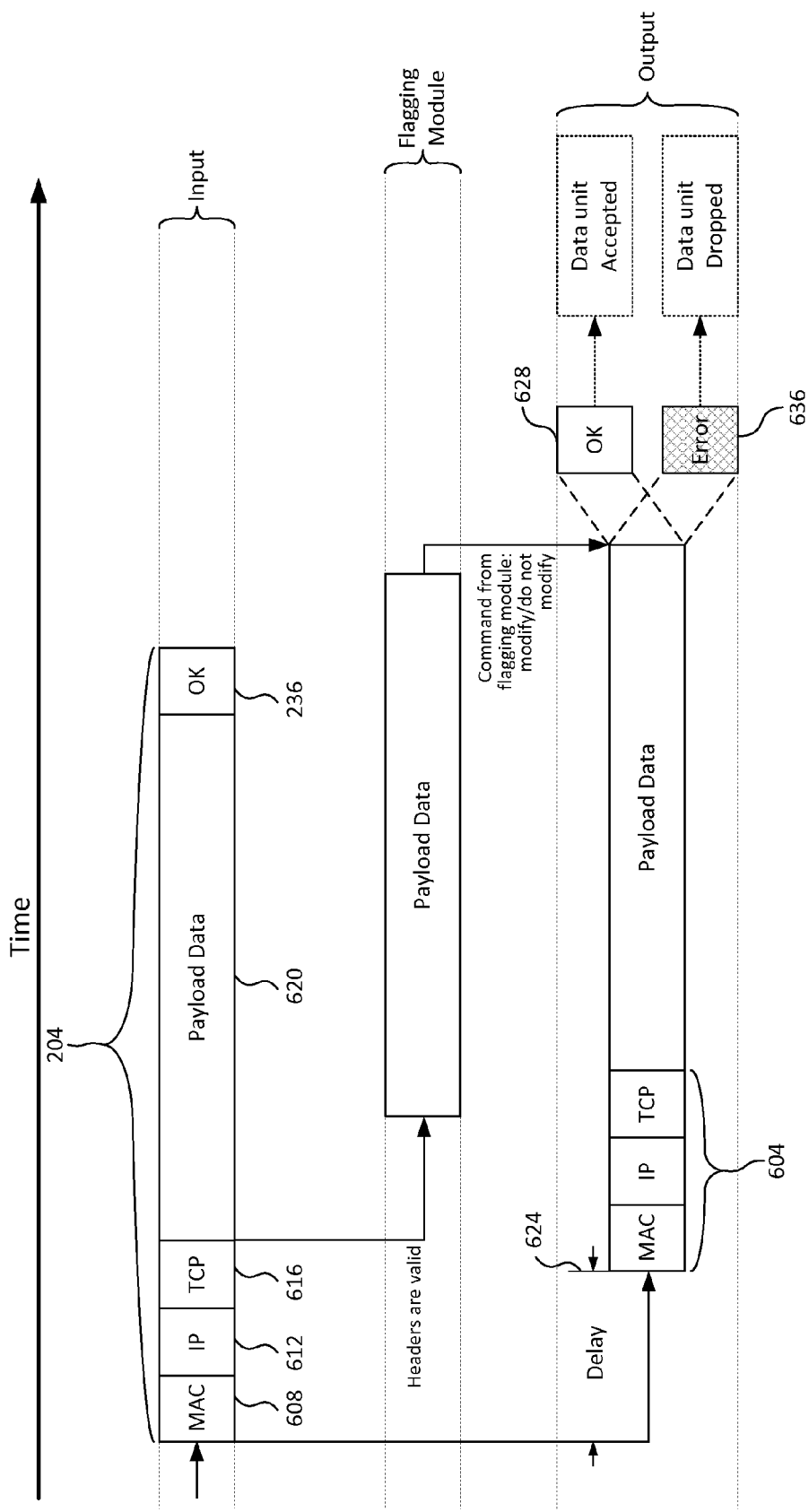

FIG. 6 is a schematic illustration of the operation of the communication apparatus on a time axis during conventional data unit reception and handling. Latency is defined as the time required to process the data unit from the instant the front portion of the data unit 204 is received to the output of the last element of the data unit, modified or not. The communication apparatus is configured to have a latency of less than 350 ns-50 ns, and preferably less than 150 ns-30 ns.

FIG. 6 is described with specific reference to the manipulation of the data unit's trailing elements such as its checksums and/or CRCs. An incoming data unit 204, being received at the input, comprises a header which includes network control information, such as network protocols 604, e.g. MAC 608, IP 612 and TCP 616 headers, and a body of data—the payload data 620. The data unit 204 also includes a trailer for error detection in the form of a checksum. A data unit inbound to the communication apparatus, being received by the PLD's input, is relayed for "cut-through" processing whereby the data unit bytes being received are forwarded for output processing at the out control module regardless of the data unit's control information, network protocol elements 604 or payload data 620. The data unit bytes being received are relayed to the flagging module 420 for deep-packet inspection and for determining whether the data unit is to be flagged once the protocols, typically up to the transport layer, e.g. TCP 616 or UDP header, have been parsed by the PLD parser module 410. Simultaneously, the data unit bytes are relayed for output processing the instant the bytes are received, but with an incurred delay 624. The delay is equal to or longer than the time to complete "cut-through" switching of the packet for output processing, completing output processing up to the trailing checksum minus the time taken parse the data unit's control information, such as the headers, relay the data unit's payload 620 to the flagging module, to complete deep-packet inspection, determine whether the data unit is to be flagged and instruct the output accordingly. Typically this delay is less than 100 ns and more likely still, less than 50 ns. In this way, the result of the flagging module determination is coincident with the completion of output processing up to the start of the trailing elements of the data unit, which includes the checksum. The delay between relaying the data unit to output and to the flagging module 624 is estimated empirically on the basis of the application-layer protocol being inspected, such as the payload data, and/or particulars of the communication apparatus processor, for example, FPGA or ASIC implementations which have slower processing speeds will take a greater number of clock cycles than faster processors for even operations. Should this estimate prove incorrect, several further steps are employed (as described with reference to FIG. 9).

If the data unit is verified by the flagging module, the flagging module does not instruct the out control to modify the data unit. The advantage of this "cut-through" system is that the data unit is simultaneously run through the flagging module as it is being output, so that the data unit is entirely output, with the exception of the element of the data unit which can be modified, hence allowing the data unit to be subsequently dropped by the network, for example due to the checksum or CRC being "errored" or corrupted, upon signalling from the flagging module.

If the data unit is valid, as determined by the flagging module, the data unit is not modified; as such the data unit's checksum 236 can be maintained in a valid form 628. Bytes of the data unit are output from the out control, as the bytes are received by the communication apparatus, regardless of the validity of the data unit. Only the element of the data unit which is to be modified is modified, provided that the element to be modified has not been output. For example, the last bytes of the data unit, comprising the checksum or CRC can be corrupted, so that the data unit is received by the host and recognised to be corrupt or erroneous and then dropped.

Leeway in non-coincidence between the determination by the flagging module and data unit output processing up to the checksum is allowable. However, if the data unit element which is to be modified, e.g. the checksum or CRC, is about to be output from the out control and the flagging module has not completed the determination step, the remaining element which is to be modified, otherwise the data unit will be accepted by the host without its validity having been determined by the intermediary entity 140. The apparatus is thus a failsafe.

A delay which is too long would result in increased latency. Any non-zero difference in the timing of the completion between the determination step by the flagging module and outbound processing of the data unit up to the data unit element which is to be modified is detrimental to the latency or accuracy of the system.

The outputting of data unit bytes from the out control cannot be suspended or delayed because the data rate into the communication apparatus 150 is equal to the data rate out of the communication apparatus 150.

The data unit bytes are each forwarded from the communication apparatus, once processed for outputting, to the data unit's intended destination whereupon it is approved by the recipient. If an element of the data unit is to be modified, as identified by the flagging module and operated by the out control, the data unit is dropped by the network since a modified data unit, and therein an erroneous checksum, transmitted to the intended recipient is dropped by the host in accordance with network protocol processing. Conversely, a data unit which has not been flagged and duly modified, maintains valid form and is subsequently accepted by the host. The system thus offloads data unit filtering processes to other network entities further down the line, such as network cards, including Ethernet cards and TOEs, switches, servers and bridges.

In accordance with FIG. 2, a flagged data unit can also have any combination of the data unit control information elements, header elements or payload data of the data unit modified, manipulated, corrupted or amended.

FIG. 6 demonstrates the system's ability to employ both deep-packet inspection and "cut-through" processing simultaneously.

FPGAs are adapted to run parallel functions and so can execute multiple processes simultaneously and efficiently, this is on top of the parallel manner of processing disclosed above, thereby serving to reduce latency on both fronts.

Figure 7:
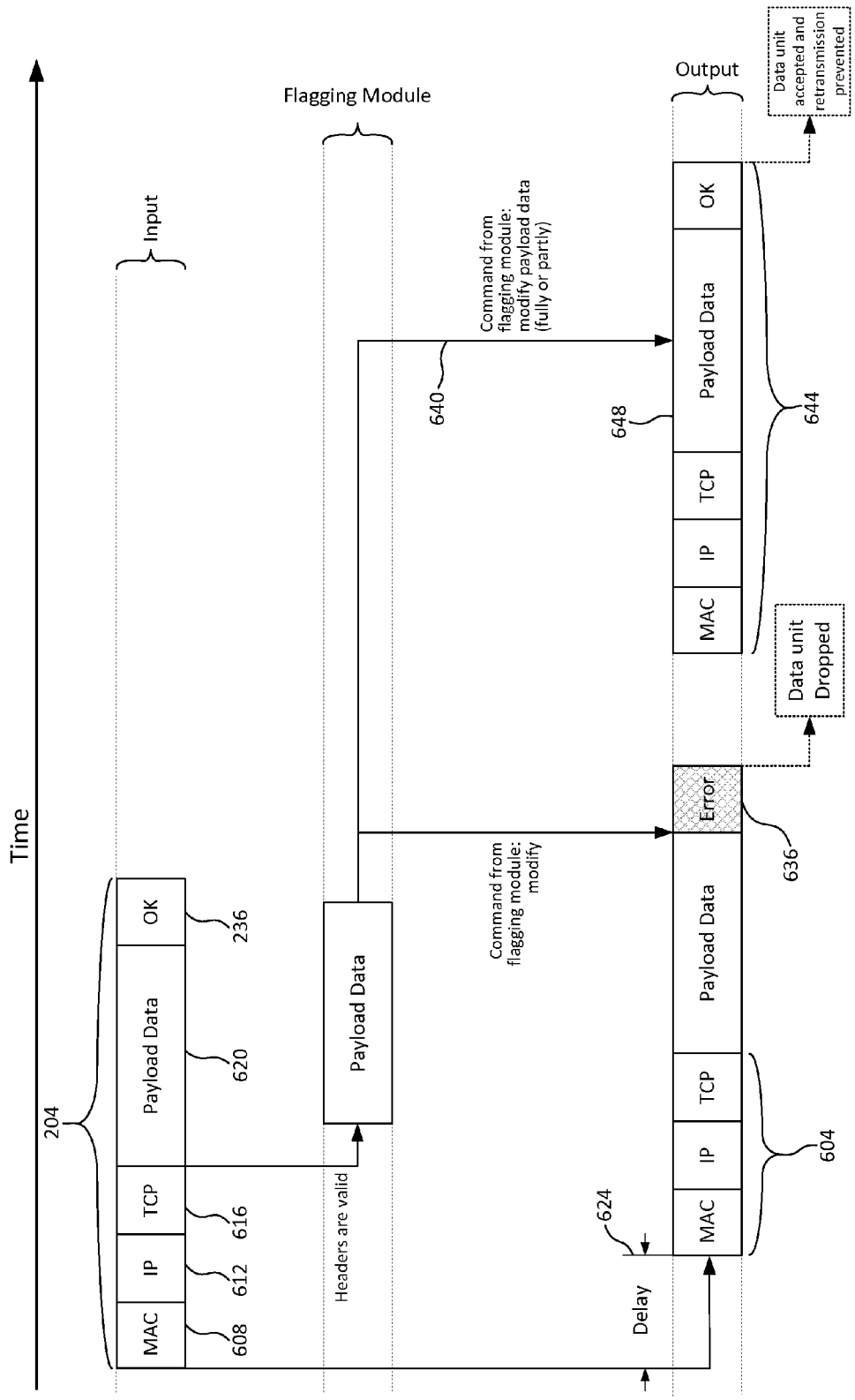

FIG. 7 shows the manner in which the communication apparatus 150 prevents the retransmission of data units that have been corrupted. Reliable transmission mechanisms used in communication protocols, such as those employed by TCP, provide for retransmission instructions to be issued by the sender of a data unit that is received in an invalid form or has been deemed to have been lost en route.

In the example shown, a data unit 204 received by the communication apparatus 150 is modified 636 (because the payload is determined to be invalid) so that once output, the data unit is handled in a manner by the network which results in the data unit being subsequently dropped by the network (e.g. by corrupting the trailing checksum of the data unit).

A reliable transmission protocol will cause the dropped data unit to be retransmitted by the sender as it will not have been received by the recipient. This retransmitted data unit will once again pass through the communication apparatus and, once again, the retransmitted data unit will be modified by the communication apparatus in an identical manner as the previous data unit 204, since it will contain the same invalid payload. This effectively results in an endless loop.

Therefore if a data unit is corrupted, the data unit is also buffered into memory and a command 640 is issued by the flagging module to modify the payload data of the buffered copy of the received data unit 204. In order to prevent retransmission, the communication apparatus then outputs the buffered copy of the received data unit 204 that is modified 644 so that the modified buffered copy 644 is validly received by the intended recipient (i.e. the data unit is not corrupted, so as to prevent retransmission), whilst also ensuring that the modified buffered copy 644 is deemed erroneous.

The payload data (or CRC in the TCP/IP headers) of the modified buffered copy 644 of the data unit is modified to ensure that the buffered copy of the data unit 644 is rejected by the intended recipient and an error notification is issued to the sender of the data unit 204.

For example, a data unit directed at a new order for an exchange-traded asset is modified by the communication device (e.g. due to violation of risk checks) so that the data unit is dropped by the network. A buffered copy of the data unit containing the new order is modified at the application layer, e.g. of a Financial Information eXchange (FIX) communication protocol, to allow the data unit to be rejected by the FIX application, for example by specifying a zero-volume trade, which will not be acted upon by the recipient (e.g. the financial exchange).

An error message is sent back to the sender to notify the sender that the data unit specified an incorrect volume; by recognising that this error is a response to a data unit sent to prevent retransmission the sender, e.g. a trader may continue to send further orders which are valid without fetter from a retransmission loop. Thus the invalid order is rejected by the recipient, whilst the TCP session remains open. The modification of the application layer of a data unit that is to be filtered shifts the error to the application layer where it is possible for the sender to identify that a particular data unit has been corrupted because it was deemed to be invalid.

Alternatively, retransmission is prevented by having the communication apparatus 150 send a data unit containing a TCP reset to the client 120 and host 110 thereby breaking the network communication connection.

Figure 8:
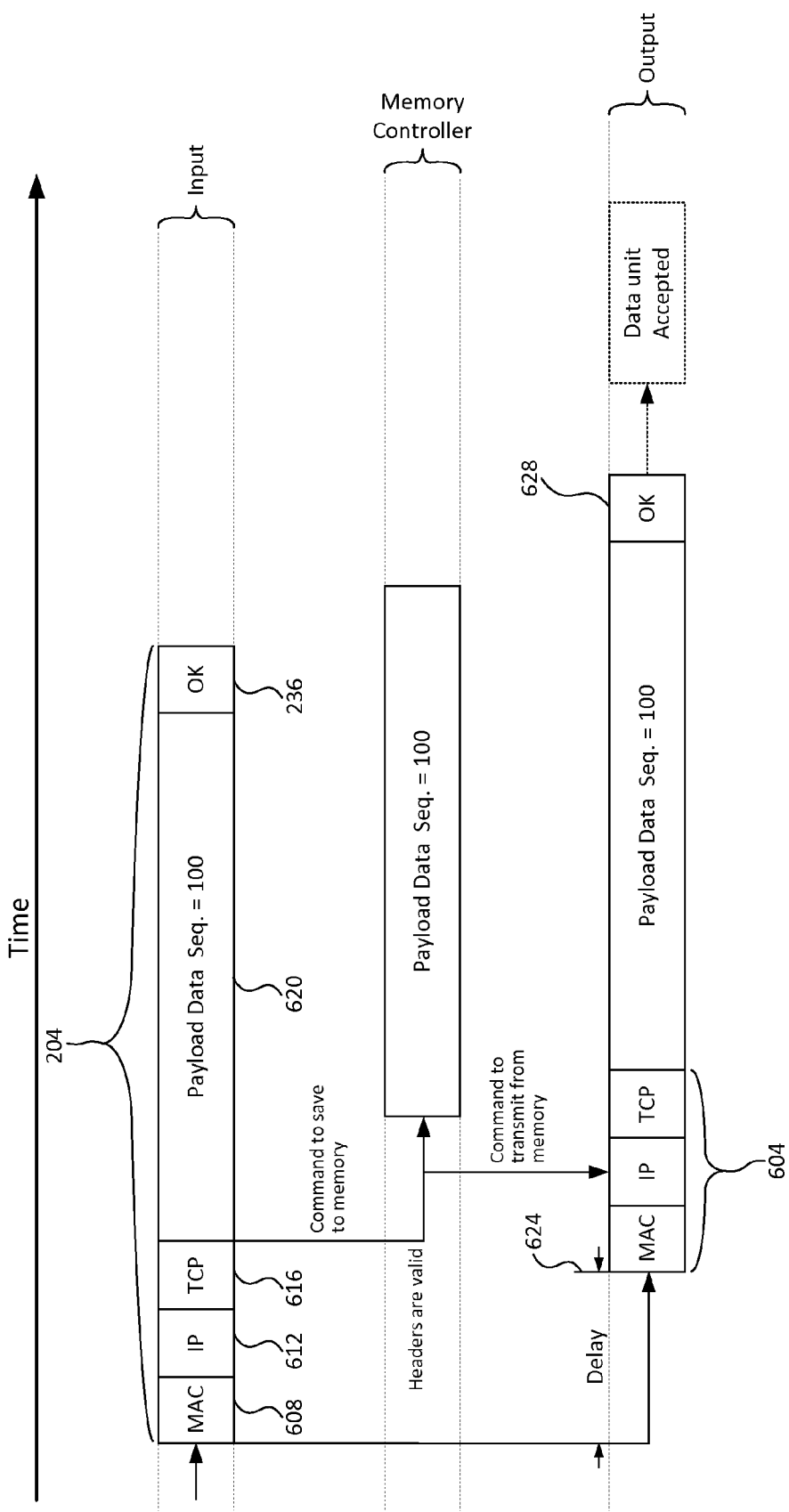
Figure 9:
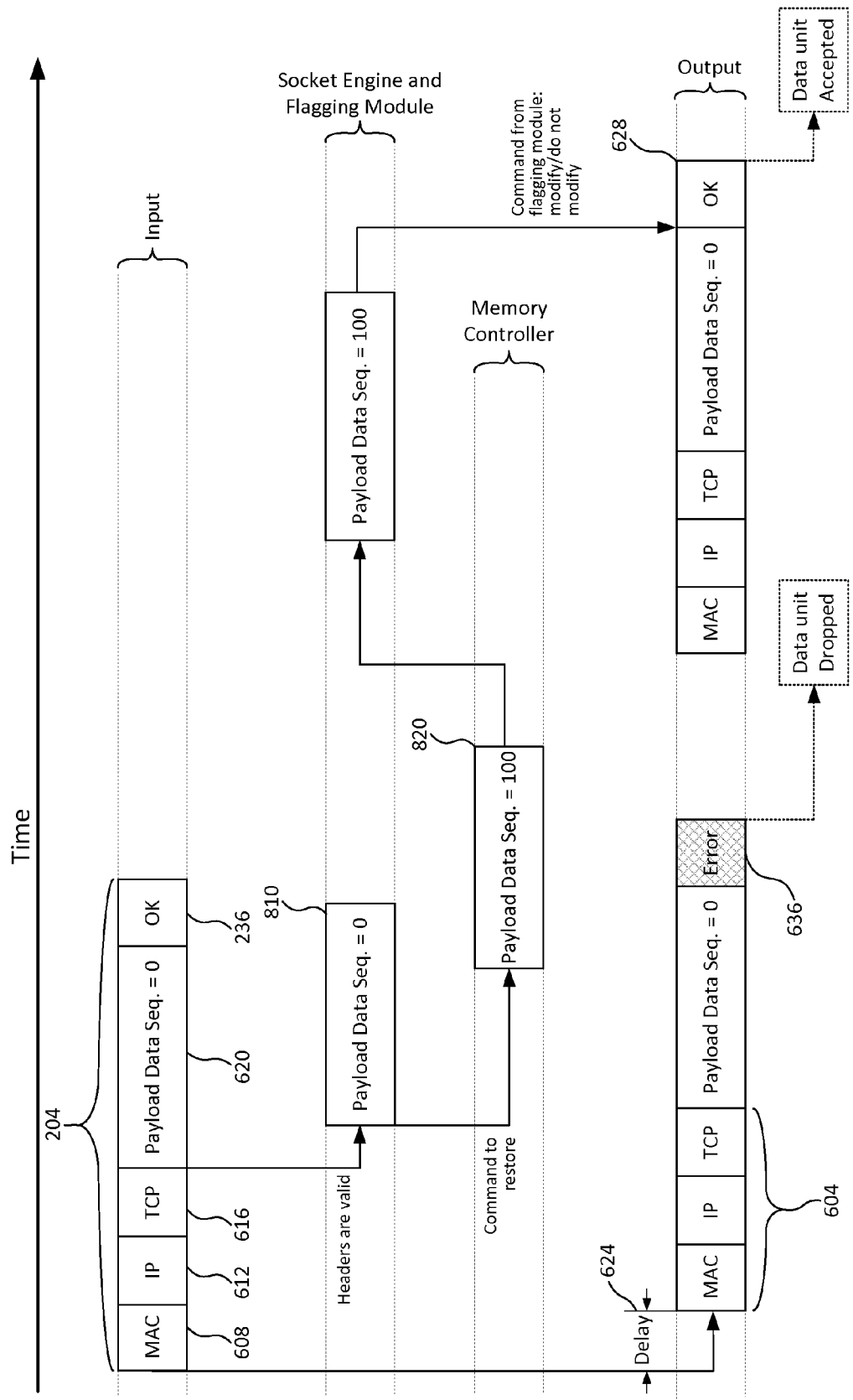
Figure 10:
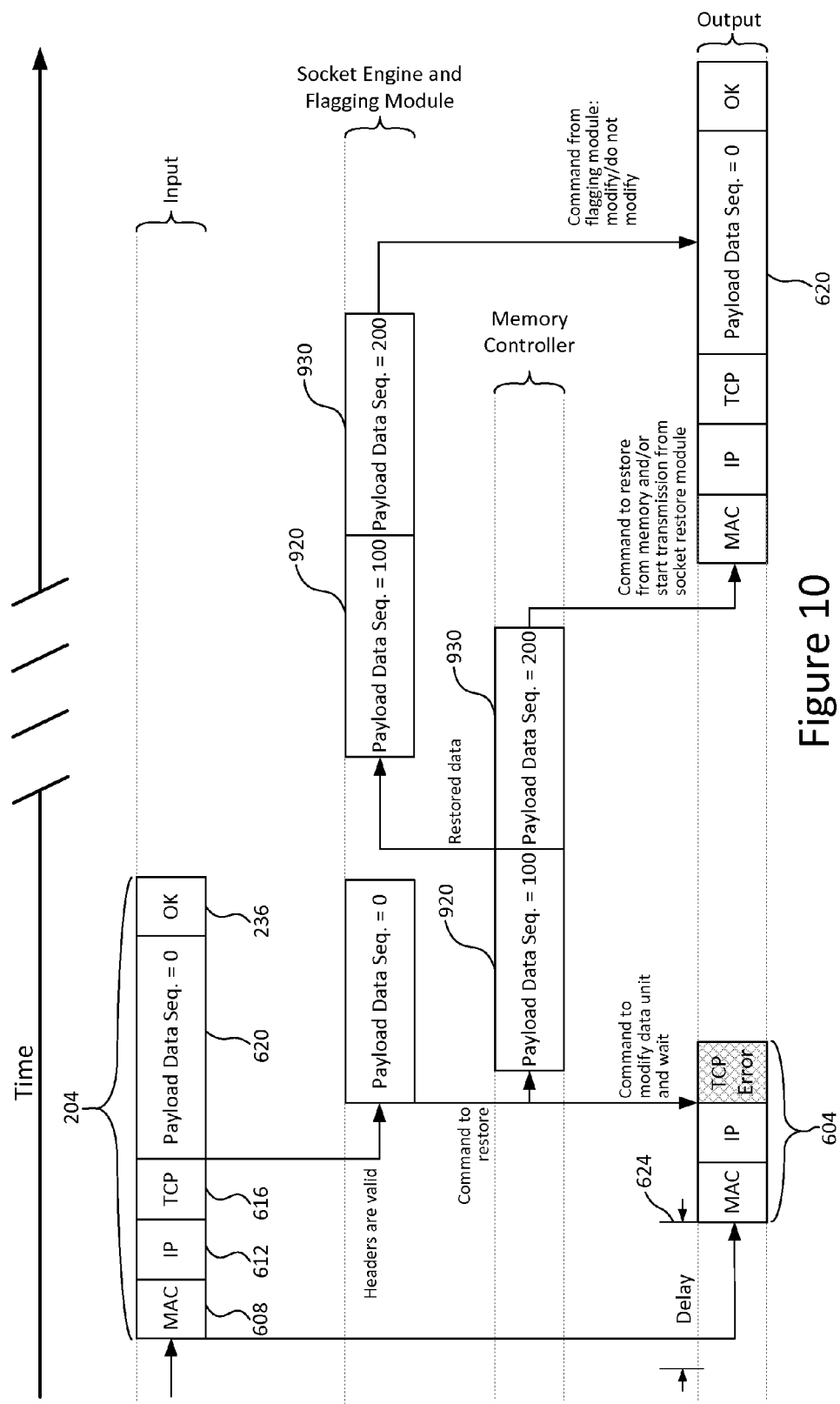

FIGS. 8 to 10 schematically illustrate various further examples of the operation of the communication apparatus 150 on a time axis, including data stream recovery using TCP or other data unit order-preserving transport protocols. As such, the communication apparatus's management of out-of-sequence data unit is demonstrated using TCP data unit order recovery.

FIG. 8 shows the receipt of an out-of-order data unit, which is stored in memory (using the system's save function, wherein elements of data units are forwarded for storage in memory components) for further processing; this is particularly useful to rectify the sequence order should the initial delay estimate 624 be proved to be incorrect.

The bytes of a data unit 204 are received at input and are subsequently "cut-through" processed to the out control with an incurred delay 624. The data unit's control information is parsed and processed at the input as it is being received. Upon processing of the control information, for example the TCP session 616, the communication apparatus determines that a data unit with a particular sequence is expected, nominally a data unit with Sequence (Seq.) number zero. This is handled by the socket engine, which interrogates the sequence number field of a received data unit and compares information relating to the sequence number of the data unit with session status information from the SHT 428, in order to determine if the data unit has been received in-sequence or not. The remaining incoming data unit bytes comprising the data payload are subsequently received, and as soon as it is determined that the data unit is out-of-sequence relative to the data unit that was expected (as indicated by the receipt of a data unit with sequence number "100"), the payload is relayed to the memory controller 416 as it is being received.

Because the received data unit is out-of-sequence, the data unit is not forwarded for processing to the flagging module (which acts on in-sequence data units). The memory controller, upon command from the socket save module 414, therefore saves the payload data bytes of the incoming data unit 204 to an external memory component 332 or memory component within the PLD without modification, rather than forwarding the data unit 204 to the flagging module. The out-of-sequence data unit is transmitted upon the command to transmit the data unit from the memory component 332. The data unit 204 bytes are meanwhile being simultaneously transmitted from the output on a first-in, first-out basis.

FIG. 9 shows a schematic illustration of the way in which the communication apparatus 150 deals with out-of-sequence data units (if there are missing data units and these are few in number) by restoring consecutive data units. A data unit being received from the network has its bytes immediately relayed as they are being received, in accordance with "cut-through" processing, to the out control module. The incoming data unit bytes are bound for the out control 408, with an incurred delay 624 such that there is coincidence between the completion of the flagging operation and the outbound processing up to the data unit element to be modified if the data unit is invalid, e.g. the checksum or CRC 236.

The incoming data unit bytes are simultaneously parsed and processed up to the start of the payload data element 620 of the data unit. The data payload bytes are relayed to the flagging module and memory components. The payload data 620 is inspected at the flagging module as per deep-packet inspection described above and a determination made as to whether or not the data unit is to be flagged. If the data unit is determined to be the missing data unit 810 (In FIG. 9, shown as data unit sequence number zero), when the out-of-sequence data unit with sequence number "100" 820 has been previously received, then the out-of-sequence data unit 820 is restored. The socket engine 426 issues a command to the socket restore and/or socket save module 418/414 to restore and/or save the data unit from and/or to memory.

A data unit payload element which forms part of the out-of-sequence data unit 820 is requested to be retransmitted by restoring the data unit from the external memory component in which it was stored. The restored out-of-sequence data unit 820 is relayed to the flagging module 420 only.

The restored out-of-sequence data unit 820 will have previously been forwarded-on to the recipient, but will not have been accepted until the missing data unit 810 has been received. When either the missing sequence 810 or a sequent data unit is considered to be invalid, the transmission of the missing sequence 810 or sequent data unit is ceased (or the data unit is corrupted) and the network session is reset; this prevents the intended recipient from processing data units that are incorrectly sequenced.

The out-of-sequence data unit 820 is inspected, as per deep-packet inspection, as to whether the data unit 820 can be output as part of a correct sequence. If not, the process of flagging and subsequent modification of the outgoing data unit, such that it is dropped by the network, is repeated so that the data unit can be restored and reprocessed until it is found to be in the correct sequence.

Once the restored data unit payload element 820 has been processed it is inserted into the correct sequence in the received payload data 620. Once the data unit is determined to be valid and compliant with respect to the intermediary entity's rules, the data unit is not flagged and the outgoing data unit is not modified as it is being output. With this, the data unit can be transmitted through the network and then accepted by the host.

FIG. 10 illustrates, similarly to FIG. 9, the means of processing data units which are significantly out-of-sequence, wherein output is ceased by the out control 408 in order to facilitate a data unit recovery process that requires more time than that required by the process associated with FIG. 9. The need for a greater length of time is due to there being a large number of out-of-sequence data units, as illustrated by the receipt of an out-of-sequence data unit 920 and an additional out-of-sequence data unit 930.

A missing data unit 204 which is being input into the communication apparatus 150 is relayed to the flagging module and "cut-through" processed to the out control 408. The data units 920 and 930 which were previously received and determined to be out-of-sequence by means of the socket engine 426 and SHT 428, and hence were stored in memory by means of a command sent to the socket restore module 418 to restore the data units 920 and 930 into the correct sequence when the missing data unit is received.

The out control module 408 corrupts the data unit being received 204 by modification as soon as possible, typically while control information is being output, e.g. the TCP header is corrupted, thereby effecting the subsequent dropping of the data unit from the system. A simultaneous request from the flagging module or socket engine is sent to the external memory controller such that payload elements with the appropriate sequence numbers 920 and 930, in this case a large portion or number of data units, are re-instated from the memory component to the flagging module 420 and restoration of the input data unit instructed at the out control. The payload elements with appropriate sequence number 920 and 930 are processed at the flagging module and if valid, combined and implemented into the payload data element 620 of the input data unit 204 as the input data unit is being transmitted to the recipient.

FIG. 11a shows one example of the process flow for out-of-sequence data units as executed by the PLD. A data unit which is being received by the PLD 1004 duly undergoes "cut-through" processing to the out control and flagging module 1008. The data unit being received has its received bytes sequentially sent to the memory controller 416 as soon as they are received and duly stored on memory components 1012. A determination is made as to whether the data unit is out-of-sequence 1016. If the data unit is not out-of-sequence, a determination of data unit validity 1020 is made as per the aforementioned functionality of the flagging module. If the data unit is valid, the entire data unit is output in an unmodified form 1024. If the data unit is invalid the data unit is manipulated as the data unit is being output; the data unit is subsequently dropped by the system 1028.

If the data unit is determined to be out-of-sequence, the communication apparatus 150 estimates the amount of time it will take to recover a data unit using, for instances where the extent of error in the sequence of the data units is small, a fast recovery process (as described with reference to FIG. 9) or, for instances where the error in the sequence of the data units is large, a long recovery process (as described with reference to FIG. 10).

The correct data unit is recovered from the memory components 1036 such that the correct sequence of data unit can be restored and implemented into the received data unit at the correct point whilst "cut-through" for outbound processing and flagging 1008.

The socket restore module 418 makes one attempt to recover a continuous out-of-sequence data unit from memory 1036 and forwards 1056 the restored data unit to the flagging module in order to determine if the restored data unit is valid 1020. The operation of recovering 1036 and forwarding the recovered data unit to the flagging module 1056 is made until the data unit sequence error is rectified.

FIG. 11b illustrates the processing of incoming data units by the communication apparatus 150 and in particular the restoration of data units when a data unit sequence error is identified. A record of the incoming data units for each TCP session is made, which includes a count of acknowledged data units, which states the sequence number of the data unit as acknowledged by the destination; processed data units, which states the sequence number of the data unit that was received by the communication device and forwarded to the flagging module; and last received data units, conveying the sequence number of the last data unit that was received by the communication apparatus, which may have been received out-of-sequence and was therefore not passed to the flagging module (but is stored in memory for further processing and is eventually restored).

FIG. 12 demonstrates a save function as executed by the communication apparatus during retransmission when a data unit is received for a first time. In particular, FIG. 12 demonstrates the ability of the communication apparatus 150 to save an incoming data unit 204, or elements of the data units, to memory components via the memory controller 416. Data units stored in the memory components are used by the socket restore module 418 and flagging module 420 for data stream recovery, i.e. re-establishing the correct sequence of data units (as described with reference to FIGS. 9 and 10) and for retransmission checks (as described with reference to FIG. 13).

FIG. 13 demonstrates retransmission of data units from memory, as per the illustration in FIG. 12. The system operates to check whether data units 204 stored in memory components of the communication apparatus 150 can be retransmitted. The received data units are checked and/or compared by the socket restore module 418. The data unit is thereby allowed or prevented from proceeding to the flagging module 420.

FIG. 14 shows exemplary functions that the socket engine 426 executes to rectify out-of-order data units. A data unit 204 inbound to the communication apparatus is stored in the communication apparatus 150 memory components. In one example the illustrated functions are conducted between the input (indicated as "In") of the socket engine 426 subsystem and the socket engine 426 subsystem output (indicated as "Out"). The socket engine 426 subsystem output leads to the input of the flagging module 420.

The naming convention of the data unit used with reference to FIG. 14 uses the first sequence number of the data unit and subsequent length if the sequence number is coincident. Three data units are stored in memory with sequence numbers S100 1310, S300 1320 and S400 1330 where each data unit is one-hundred units in length (L100). A data unit with sequence number S200 1340 is missing.

In a first example function a save and restore function is executed and the data unit with sequence number S200 1340 is in the process of being received (by the input of the socket engine) out-of-sequence. The data unit with sequence number S200 1340 is saved to the memory component and the data unit with sequence number S300 1320 is restored from memory. The data unit with sequence number S200 1340, S300 1320 and S400 1330 are duly output from the socket engine, e.g. to a host FIX protocol parser (in one example, the flagging module is implemented as a combined FIX protocol parser and risk calculation system, e.g. for processing trading limits).

A further example illustrates a check and save (and, optionally, restore) function. A data unit with sequence number S150 1350 and length L100 is in the process of being received at the input of the flagging module—a likely scenario for retransmitted data units. A check function is operated by the flagging module or socket engine to determine if any data units stored within memory overlap with the data unit being received 1350. A check in this case will reveal a single portion of data unit S100 1310 to have overlapping elements (i.e. S150-S200) with data unit S150 1350, a comparison between the overlap region of the data units is conducted for assurance that the data unit has been received correctly. The excess of data unit S150 1350 (i.e. S200-S250 1360), that is the length of the data unit which is unaccounted for within the system's memory, i.e. length L50, is saved to the system (optionally restored) and transmitted for output.

A final example illustrates a save function, wherein a data unit with sequence number S200 and length L300 1380 is in the process of being received. Under these circumstances, the data unit in the process of being received is used to overwrite the overlapping data units, i.e. S300 1320 and S400 1330, as the new data unit overrides the stored data unit—as is governed by many network protocols, including the FIX protocol. The received data unit 1380 is thereby used to replace data units S300 1320 and S400 1330, and can be output.

FIG. 14 is used to illustrate, by way of an example, the functions used to restore transmission due to out-of-sequence data units. Generally, it can be understood that the socket engine 426 and/or flagging module 420 is configured such that received data units are stored in memory components, such that when an out-of-sequence data unit is received a sequence of data units received after the out-of-sequence data unit is received can be retransmitted. In addition, the data units can be checked against memory in order to efficiently restore only those segments which have been received in an out-of sequence manner.

FIG. 15 illustrates an example process flow for order processing by the communication apparatus 150. The process is initiated when a client sends a network data unit to the host which is being received by the intermediary communication apparatus (step 1504). In one example, the data unit sent by the client comprises a trade order. The trade order data unit 204 possesses network control information, such as a header with address components. The payload of the data unit instructs the host as to the intention of the trade, e.g. buy or sell orders, and specifies the type, name or identity of the security or instrument to be traded, e.g. debt, currency, equity, derivative or any other financial security or instrument. The instruction of the payload data of the data unit is identified by means of deep-packet inspection so as to aid determination of whether or not the data unit is to be flagged and modified by the communication apparatus 150 during output of the trade order.

The data unit 204 from the client is received at the communication apparatus 150, wherein the status of the data unit trade order is determined 1508. The status of a trade order informs the communication apparatus 150 of the status flag, last received data unit sequence, last received acknowledgement, the origin and destination, including session, client and/or host information, of the trade order. The session-specific and transmission-orientated status of the trade order is determined by consulting information stored on the communication apparatus's rules modules 1512 including the Socket Hash Table (SHT) and Rules Hash Table (RHT) components therein containing Parameter A values 1516. The Parameter A values 1516 allow the communication apparatus 150 to relate the incoming trade order with information regarding the status of the session from which the data unit originated, since information regarding the status of said data unit will form the basis of the decision of how the data unit is handled. While information needed to determine data unit status is located in different elements of the data unit, for example—socket information is located in the headers while particulars of the order instruction are contained in the payload, the data unit is processed by the communication apparatus as soon as the apparatus 150 has enough data, which can be before the full data unit is received. It allows the communication apparatus to save time and cut the induced latency by processing available parts of the data unit while the remainder of the data unit is being received. The term "session" is herein used to refer to network sessions and/or business (e.g. financial trading) sessions.

The Parameter A values contain the status for the given session. Parameter A value statuses are a function of historical data exchange between client and host for a given session and comprises session information, hand-shake information and data exchange sequence information. The Parameter A information regarding data unit origin and destination information includes, in the case of a MAC/TCP/IP network protocol structure, a MAC and/or TCP address for host and client, status flag, data unit acknowledgement information and any further information regarding the sequence of the data unit which allows the communication apparatus 150 to determine whether the data unit has been received in the correct sequence order, if not the mechanisms to deal with the data unit are illustrated in FIGS. 8-10. At the instant when the communication apparatus has received and processed a sufficient amount of data from the data unit, the session origin, typically found in the data unit's TCP header, can be processed such that the data unit can then be related to a given session and thus Parameter A value. Deep-packet inspection of the data unit payload data is performed 1520, as soon as a sufficient amount of the data unit's payload data is processed, in order to determine the trade order instructions.

The communication apparatus 150 consults the Parameter A values 1516 in the SHT and/or RHT, it identifies the rules applicable to the session of the trade order and determines whether the trade order, in light of the data unit's status, is valid with respect to the associated Parameter A value 1524. For example, for given host-defined session or sequence rules the system determines whether the data unit is acceptable with respect to the Parameter A values 1524. If the data unit's elements are not valid with respect to their associated Parameter A value, the data unit is identified by the flagging module for modification by the out control and is subsequently modified 1528 and dropped by the network 1532. In this eventuality, the trade is not executed and the client is duly notified 1536, for example by means of dropping TCP session to host.

If the data unit is valid with respect to its associated Parameter A value the data unit is not flagged; instead, a further determination step 1540 is taken to decide whether the data unit's trade order would exceed a Parameter B value 1544 within the rules module 1512. Parameter B values 1544 are rules for a plurality, if not all, sessions from a particular client, or client-host combination, and comprises rules which are a function of historical data exchange between a plurality of client sessions and a host or a plurality of host sessions, if not all, sessions established between client and host. Parameter B values can comprise a trading limit applied to the sessions across multiple or all sessions of a client. The Parameter B values for a given trading institution can be associated with unique clients or plurality of sessions therein. The determination step for determining whether or not Parameter B values are exceeded 1540 involves consulting the Parameter B values 1544, which lie in the rules module 1512, to determine whether the trade order, if executed, will contravene the rules of the applicable Parameter B value for the given client or plurality of sessions. If the outcome of the determination step returns a violation of the Parameter B value, then the data unit is flagged and modified 1528. The modified data unit is output according to the eventualities shown in FIG. 2, such that it is dropped by the network 1532, thereby preventing the trade from being executed and the applicable Parameter B value being exceeded. The client is duly instructed 1536.

Parameter A values are session-specific and are a function of historical exchange between client and host in one particular TCP session or neighbour TCP session. While Parameters B values are related to a group of sessions, such as all sessions between client and host. Both Parameter A and Parameter B values can be initialised at start-up and manipulated by a communication apparatus 150 interface 160 via, for example, a PCIe bus. In order to implement Parameter A values a record of data units that have been received and output from the communication device 150 is made and the change in position (e.g. a financial trading position) due to those data units is determined.

An inbound network data unit trade order, compliant with the associated rules values of the rules module 1512 components—Parameter A values and Parameter B values—is not flagged by the flagging module, not manipulated by the out control 1548, output as per FIG. 2, accepted by the host network protocols and the trade executed 1552. The client and intermediary host are duly notified 1536. Since Parameter A and Parameter B values are a function of data exchanged between client and host, the Parameter A and B values associated with the executed trade are updated to represent the new value of the open positions for the given session and client, which stands to instruct the determination step considering the validity of the next inbound trade order. The current values associated with the Parameter B and/or Parameter A values can be updated following data exchange.

The plurality of rules each associated with a given session and instruction permits the communication apparatus, to flag and modify trade orders such that the data unit trade orders are dropped based on content at the data payload level, owing to deep-packet inspection, and not just at header level. Distinctly, the communication apparatus 150 can also flag data units at client and session level, owing to Parameter B values and Parameter A values respectively.

Crucially, the process illustrated in FIG. 15 is executed at a hardware level by the communication apparatus, this stands in contrast to an intermediary entity's traditional method of employing software implementations executed on CPUs. Therefore, such an apparatus obviates the need for CPU network processing by utilising "cut-through" deep-packet inspection and consequent data unit flagging with subsequent filtering consequences on remote networked devices, resulting in ultra-low latency functionality.

The hash tables are shown in exemplary form, indeed any number of hash tables can be present storing any number of parameters which aid in determining if the data unit is to be modified such that it changes the network's handling of the data unit.

FIG. 16 demonstrates an exemplary three-way handshake, in the network comprising the two remote entities—client and host—and the intermediary entity's communication apparatus. The purpose of the three-way handshake is to establish a connection orientated TCP connection between entities; such a connection might have been established or is a completely new connection.

A synchronisation packet (SYN) is received by the communication apparatus from the client in order for the client to initiate a connection with the host. The synchronised packet 1604 possesses a sequence number, a, representing an arbitrary and random number. A truly random sequence number is not required, however the more random, the greater the security.

The communication apparatus 150 then searches 1608 the Socket Hash Table to determine whether there is a record of a previous connection for the session associated with the packet. If the packet has an associated hash value in the SHT, then the packet is dropped. If the packet does not possess a hash value in the SHT, the connection from this particular session must be new and the SYN packet is attempting a new connection. The Rules Hash Table is instead consulted 1612 such that a Parameter B value can be used by the communication apparatus 150 to determine a subsequent trade's validity. The Rules Hash Table is modified by the intermediate entity, e.g. broker, via the interface 160 of the communication apparatus 150. The RHT contains information about how the session is to be treated and whether or not data from the session is to be flagged and modified. More generally, the RHT specifies information which should be attached to the session in order to aid determination of the data unit's validity, for example the Parameter B values. Once a hash value is found or created in the RHT, the associated session information is added to the SHT 1616 and the SYN packet transmitted from the communication apparatus to the host 1620.

The host receives the SYN packet and acknowledges (ACK) receipt of the SYN packet and issues its own SYN packet. ACK of the receipt of the client's synchronisation request is issued by the host to the client upon valid receipt of the client's synchronisation request. The acknowledgment of the receipt of the client's synchronisation request possesses a sequence number equal to a+1, simultaneously, the host's synchronisation request, denoted by a sequence number 'b' is dispatched along with the acknowledgement 1624. The dispatch of the aforementioned information occurs via the communication apparatus, such that the sessions are identified and the associated rules found by conducting a search in the SHT 1608. The rules, which are a function of the historical data exchange between host and client, are updated 1628.

The client receives the synchronisation request form the host via the communication apparatus 150 and acknowledgement from the host. The client issues an acknowledgement of the host's synchronisation (ACK-SYN) request by responding with a sequence number b+1 1636. The packet is received by the communication apparatus, a search in the SHT conducted 1608, the associated item found and the item updated in the SHT 1628.

The host receives the client's acknowledgement of the host's SYN 1648 thereby completing the three-way handshake and establishing a new connection or re-establishing an old connection. Trades between client and host via the communication apparatus 150 on the intermediary entity can now ensue.

FIG. 17 shows an exemplary process flow for a network protocol for establishing and closing a TCP network connection between a client and host via the intermediary entity and communication apparatus. The host awaits an incoming connection 1410. The host receives a synchronisation (SYN) packet from the client 1420. The host responds by sending an acknowledgement (ACK) of the client's SYN packet, this is received by the communication apparatus and connection a between client and host, via intermediary communication apparatus, is established 1430.

A data exchange can ensue and a notice, in the form of an ACK packet, of the completion of data exchange issued by the client is received by the host via the communication apparatus 150 and the connection is closed 1450.

If instead the host and/or communication apparatus 150 receive an invalid SYN packet from the client, the communication apparatus immediately closes the connection 1450. In checking validity the communication apparatus and/or host checks the SYN status flag, window scale opt and/or size of the SYN packet.

FIG. 18 shows an exemplary schematic of data unit inspection against an exemplary table of Parameter A values and Parameter B values. A data unit 1708, composed of header elements 1716, including a lower level OSI layer header e.g. a MAC header 1724 and a higher OSI layer level header e.g. a TCP header 1732, data payload 1740 and a trailer in the form of a checksum or CRC 1748. Further elements of the data unit 1708 can also be present, such as IP headers, in line with typical Ethernet frames. Further, alternative data unit constructions are also possible, including UDP datagrams.

The data unit 1708 is processed by the communication apparatus 150 such that the data unit is processed byte-by-byte as it is being received by the communication apparatus. The lowest level header is therefore first received and first processed, i.e. the MAC header 1724 followed by the next header element, e.g. the TCP header 1732. Elements of the MAC header 1724 and/or TCP header 1732 are processed to determine the source and destination of the data unit at client-level, IP headers can also be used in a similar context and/or the source and destination sessions, ports, or similar information derivable from the TCP header 1732. If the client source and destination are fixed, use of the session destination or source can be used to streamline the process. When a sufficient number of the MAC header 1724 and/or TCP header 1732 bytes have been received and processed the origin of the data unit can be determined by relating the information in the MAC header 1724 and/or TCP header 1732 to a hash value, by means of a hash key, and thus the rules applicable to the data unit are found within the rules module 212 corresponding to the computed hash value. The example illustrated in FIG. 18 shows that the computed hash value for the data unit 1708—$H_3$—identifies the data unit to have originated from a "Client 1" and a "Session 3", as such a search is conducted in the rules module 212, specifically in the Socket Hash Table 428 to identify whether "Client 1" has previously established a connection. If the client has previously established a connection with the communication apparatus then the Socket Hash Table 428 will be in possession of information and rules relating to the hash value computed from the data unit 1708 and thus information and rules applicable to the client and/or session from which the data unit originated The rules associated with a given client are provided by a Parameter B value, and it is shown that the hash value associated with "Client 1" has a Parameter B value of "3,000,000". If the data unit has not previously established a connection the procedure of using the RHT and associated Parameter B is followed as illustrated in FIG. 17. Parameter B values are also consulted in the same way as Parameter A values, but without session-specificity and only with client and/or host specificity.

Rules associated for an individual session of a given client are provided by a Parameter A value. A hash value associated with a unique client session can be determined by computing hash values based not only on headers with client information, but also those with session specificity, as such the TCP header 1732, including session origin and/or destination, can be taken into account when computing a hash value for deriving Parameter A and Parameter B for the data unit 1708. In this example, the data unit is determined to be "Session 3" from hash value $H_3$. The communication apparatus can thereby relate historical information about data exchange between client, communication apparatus and host. For example the number of trades, data unit status flags, session addresses and data unit sequence information rules associated with a data unit's session can be associated with Parameter A values. The result of deep-packet inspection as to whether or not to flag a data unit is therefore dependent on the data units that have passed through the communication apparatus before.

The data unit's payload element 1740 is examined, as the elements of the data unit are being received, by means of deep-packet inspection. In the case of a financial trade, the data unit payload data 1740 contains a trade order, for example, expressing a specific instrument to be traded, in this case an "Instrument X". This trade order can be compared with the Parameter B values appropriate for a data unit from "Client 1", the historical data exchange between "Client 1" and a host and the instructions or information contained in the incoming data unit. In the illustrated case the Parameter B value is a limit value associated with the hash value of the incoming data unit—$H_3$. The Parameter B value associated with hash value's client—"Client 1"—is a limit value for trade orders which would exceed the broker-defined limit value for the client—"3,000,000". Upon further inspection of the data unit's payload data 1740, further information regarding the trade order can be determined in order to fully apply the rule. A "Buy" 1764 order instructs that "60,000" units 1772 are to be bought. The current Parameter B value—a dynamic value in dependence of historical trade execution—of open positions associated with the Parameter B for the incoming data unit's client origin is compared against the applicable Parameter B value and further against the trade order of the data unit 1764 and 1772. It can be seen that a "Buy" order of "60,000" units would exceed the Parameter B limit value—"3,000,000" units—given that the current Parameter B value is "2,963,121" units.

With this information, the flagging module determines that the data unit is to be modified since it contravenes a rule of the intermediary entity 140. The data unit's trailer, e.g. checksum, CRC or similar, is corrupted 1780 by the out control just prior to the data unit's trailer being output from the out control. The corrupted trailer is output from the communication apparatus 150 and the data unit is subsequently dropped by the network upon arrival at its intended host destination, where processing of the data unit returns an erroneous trailer, such as a checksum, and therefore invalid data unit. Hence, the trade order is not executed. The communication apparatus 150 can also update its current Parameter B value if a trade were to be executed.

Likewise, a trade order can be flagged and modified if the session information related to the data unit, in particular the TCP header 1732, is not consistent with the rules of Parameter A. For example, if a data unit is found to have been received as part of an incorrect sequence or blacklisted session.

The hash table illustrated in FIG. 18 is exemplary; any number of parameters can be used to determine if a data unit is valid with respect to the rules of the intermediary entity. Furthermore, each parameter may correspond to a unique hash value, which is determined using any information contained in the data unit or combination of information therein. For example, a unique hash value may correspond to both the Parameter B value—determined using the MAC header 1724 for example—and the Parameter A value—derived using session information from the TCP header 1732 for example. Parameters A and B are also only exemplary parameters, any number Parameters can be used and associated with a plurality of rules, elements of the data unit, sessions, clients, hosts or combinations and derivatives therein. Additional parameters can be based on certain trading instruments, number of open positions, trading volumes, client-host combinations and/or session-host combinations, each of which can be excluded or have associated limit value.

Alternatives and Modifications

A variety of network protocol stack layers can be used in place of the aforementioned examples. Alternative network protocol stack layers include HyperText Transfer Protocol (HTTP), File Transfer Protocol (FTP), Real-time Transport Protocol (RTP), Datagram Congestion Control Protocol (DCCP) and any derivative and modified forms including "lite" network protocol stack layers. In general, the PLD can host any custom network protocols.

Application layer protocols of the system require compliance with the network systems of the client and host. In the case of electronic financial instrument trading, compatibility with the Foreign Information eXchange (FIX) protocol, as is widely used by exchanges, is important. Further derivatives of such systems, such as the FIX algorithmic trading definition language (FIXatdl) protocol, FIXML, and FIX Adapted for STreaming (FAST) can also be considered. In general however, any application layer protocol is acceptable. Many financial exchanges have their own FIX-like or binary protocols, for example the London Stock Exchange, Chicago Mercantile Exchange, NYSE Euronext, Chi-X/BATS. The communication apparatus 150 can be enabled with support for these protocols.

The FIX protocol, or similar, also contains its own form of checksum and Security Check thru Signature, included in its data units, which can both also be modified by the communication apparatus 150 to effect data unit validation.

Alternative network designs are also applicable to the system described herein. A local connection between client, communication apparatus and host is also possible, e.g. via a bus such as a PCIe, LVDS, direct chip-to-chip connections, etc.

The system is also applicable for Over The Counter (OTC) trading, between bilateral parties such as client and host via the communication apparatus, wherein the host and communication apparatus can be part of the same institution such as an investment bank, market maker or broker.

The communication apparatus 150 has utility in multiple fields, such as low latency filtering and network processing applications for cyber security (so as to filter potentially harmful or unwanted transmissions) or where high-performance servers with high throughput and low latency are required, e.g. for research (including high-energy particle colliders, astronomy, genetics, etc.), data mining and media processing.

It will be understood that the present invention has been described above purely by way of example, and modifications of detail can be made within the scope of the invention.

Each feature disclosed in the description, and (where appropriate) the claims and drawings may be provided independently or in any appropriate combination.

Reference numerals appearing in the claims are by way of illustration only and shall have no limiting effect on the scope of the claims.

The invention claimed is:

1. A network communication apparatus, which comprises:
   a receiver for receiving a data unit, the data unit including payload data;
   a transmitter for forwarding the data unit on to a further network location;
   a first processor for inspecting the payload data of the data unit; and
   a second processor for modifying a trailing portion of the data unit before an entire trailing portion has been forwarded on to the further network location in dependence on an outcome of a data unit inspection thereby to alter subsequent handling of that modified data unit once it has been forwarded on to the further network location.

2. The apparatus of claim 1, wherein the data unit further includes control information and the second processor is adapted to modify the control information.

3. The apparatus of claim 2, wherein the control information includes at least one or more of the following: source and/or destination address information; sequencing information; and error detection information.

4. The apparatus of claim 2, wherein the second processor is adapted to corrupt and/or overwrite at least part of the control information so that the data unit is subsequently dropped.

5. The apparatus of claim 2, wherein the control information includes header and/or trailer information, preferably including one or more of the following network protocol information: Transmission Control Protocol (TCP); User Datagram Protocol (UDP); Internet Protocol (IP); Media Access Control (MAC); and error detection information.

6. The apparatus of claim 2, wherein the second processor is adapted to overwrite at least a portion of a trailing checksum or cyclic redundancy check (CRC), and preferably wherein the second processor is adapted to corrupt the control information in the trailing portion of the data unit.

7. The apparatus of claim 2, wherein the first processor is adapted to inspect the payload data or the control information while the data unit is being forwarded on to the further network location.

8. The apparatus of claim 7, wherein the first processor is adapted to parse the data unit to extract the payload data or control information for inspection while the data unit is being forwarded on to the further network location.

9. The apparatus of claim 8, wherein the first processor is adapted to determine at least one or more of the following based on an inspection of the control information: session information, sequencing information, receiving party identify, transmitting party identity, status information; and port information.

10. The apparatus of claim 9, wherein the second processor is adapted to modify the data unit in dependence upon said control information.

11. The apparatus of claim 1, wherein the second processor is adapted to modify the trailing portion of the data unit after a remainder of the data unit has already been forwarded on to the further network location.

12. The apparatus of claim 1, wherein the second processor is adapted to modify the data unit as the data unit is being forwarded on to the further network location.

13. The apparatus of claim 1, wherein the second processor is adapted to corrupt and/or modify the payload data.

14. The apparatus of claim 1, further comprising memory for storing data units for subsequent onward transmission.

15. The apparatus of claim 1, wherein the second processor is adapted to modify the data unit as soon as an output from the first processor is available.

16. The apparatus of claim 1, further comprising memory for storing payload data for subsequent retrieval and onward transmission.

17. The apparatus of claim 1, wherein the first processor for inspecting the payload data of the data unit is adapted to perform a deep-packet inspection of the data unit, preferably to a level of an application layer of the data unit.

18. The apparatus of claim 1, wherein the data unit is passed both to the transmitter and to the first processor.

19. The apparatus of claim 1, wherein the data unit is being stepped through the apparatus, preferably byte-wise, while the first processor is carrying out an inspection of the data unit.

20. The apparatus of claim 1, wherein the payload data is in a form of an instruction or request, and the first processor is adapted to determine validity or acceptability of said instruction or request, preferably the instruction or request is a financial trading instruction.

21. The apparatus of claim 20, wherein the second processor is adapted to modify the data unit if an invalid or unacceptable instruction or request in the payload data.

22. The apparatus of claim 1, wherein the apparatus is in a form of a programmable logic device, preferably in the form of a Field Programmable Gate Array (FPGA) or an Application-Specific Integrated Circuit (ASIC).

23. The apparatus of claim 1, where a functionality of the apparatus is implemented in hardware, preferably wherein the apparatus further comprises a TCP offloading engine.

24. The apparatus of claim 1, further comprising
a processor for identifying a session associated with a selected data unit; and
wherein the processor for inspecting the payload data of the selected data unit is adapted to compare the selected data unit with parameter information relating to the session associated with the selected data unit thereby to determine validity or acceptability of the selected data unit.

25. A communication system comprising:
a first network entity, preferably in a form of a server;
a second network entity, preferably in the form of a client, connectable to the first network entity via a communications network; and
an intermediate network entity which comprises a communications apparatus for intercepting communications between said first and second network entities, wherein the communications apparatus comprises:
a receiver for receiving a data unit, the data unit comprising payload data;
a transmitter for forwarding the data unit on to a further network location;
a first processor for inspecting the payload data of the data unit; and
a second processor for modifying a trailing portion of the data unit before an entire trailing portion has been forwarded on to the further network location in dependence on an outcome of a data unit inspection thereby to alter subsequent handling of that modified data unit once it has been forwarded on to the further network location.

26. A method of monitoring network communications, which comprises:
receiving, by a receiver, a data unit, the data unit including payload data;
forwarding, by a transmitter, the data unit on to a further network location;
inspecting, by a first processor, the payload data of the data unit;
and modifying, by a second processor, a trailing portion of the data unit before an entire trailing portion has been forwarded on to the further network location in dependence on an outcome of the data unit inspection thereby to alter subsequent handling of that modified data unit once it has been forwarded to a further network location.

27. The method of claim 26, further comprising identifying a network session associated with the data unit; and comparing said data unit with parameter information relating to that session thereby to determine validity or acceptability of the data unit.

* * * * *